United States Patent
Wolkerstorfer

(10) Patent No.: US 7,290,649 B2
(45) Date of Patent: Nov. 6, 2007

(54) ROLLER ARRANGEMENT FOR AN ACCUMULATING ROLLER CONVEYOR

(75) Inventor: Christoph Wolkerstorfer, Niederwaldkirchen (AT)

(73) Assignee: TGW Transportgeräte GmbH, Wels (AT)

( * ) Notice: Subject to any disclaimer, the term of this patent is extended or adjusted under 35 U.S.C. 154(b) by 365 days.

(21) Appl. No.: 10/517,012

(22) PCT Filed: Jun. 6, 2003

(86) PCT No.: PCT/AT03/00166

§ 371 (c)(1),
(2), (4) Date: Dec. 7, 2004

(87) PCT Pub. No.: WO03/106305

PCT Pub. Date: Dec. 24, 2003

(65) Prior Publication Data

US 2006/0113166 A1    Jun. 1, 2006

(30) Foreign Application Priority Data

Jun. 14, 2002 (AT) ................................ A 907/2002

(51) Int. Cl.
*B65G 13/073* (2006.01)
*B65G 47/26* (2006.01)

(52) U.S. Cl. .................... 198/781.05; 198/781.01; 198/781.02; 198/781.03; 198/781.04

(58) Field of Classification Search ................ 198/781.01–781.05, 792; 193/37, 35 A
See application file for complete search history.

(56) References Cited

U.S. PATENT DOCUMENTS 3,729,088 A * 4/1973 Stein et al. ............. 198/781.07
4,063,636 A   12/1977 vom Stein
4,286,441 A * 9/1981 Scheneman et al. ............ 464/36
4,421,224 A * 12/1983 Dingman ............... 198/781.02

(Continued)

FOREIGN PATENT DOCUMENTS

CH           607 975        12/1978

(Continued)

*Primary Examiner*—Douglas A Hess
(74) *Attorney, Agent, or Firm*—Collard & Roe, P.C.

(57) ABSTRACT

The invention relates to a roller arrangement (7) for a stowing roller conveyor, comprising a stationary roller axle (20) arranged in a support frame (4) of the stowing roller conveyor, with a driving roller (9) and a conveying roller (10) adapted to be driven and/or braked, if necessary, being rotationally supported on said roller axle; as well as a clutch system (12) arranged between said driving and conveying rollers and comprising clutch components (14, 15) adjustable in relation to one another via a setting device (13), whereby at least one of the clutch components (14, 15) is axially adjustably arranged on the roller axle (20) and adjustable against at least one spring element (36), from a switching position in which it is engaged, into a switching position in which it is disengaged, and whereby the first clutch component (14) is drive-connected with the conveying roller (10), and the other clutch component (15) with the driving roller (9). A setting device (47) for setting a force of contact pressure to be adjusted between the clutch components (14, 15) depending on the weight of the piece goods (14), is arranged between the conveying roller (10) and the first clutch component (14). Furthermore, the invention relates to a stowing roller conveyor in which the roller arrangement (9) as defined by the invention is arranged.

34 Claims, 13 Drawing Sheets

U.S. PATENT DOCUMENTS

| | | | | |
|---|---|---|---|---|
| 4,706,801 A | * | 11/1987 | Vessey | 198/781.02 |
| 5,033,611 A | * | 7/1991 | Huber | 198/782 |
| 5,076,421 A | * | 12/1991 | Walker | 198/781.02 |
| 5,131,527 A | * | 7/1992 | Huber | 198/782 |
| 5,810,157 A | | 9/1998 | Nolan | |
| 5,906,267 A | * | 5/1999 | Heit et al. | 198/781.05 |
| 6,286,659 B1 | * | 9/2001 | Petrovic | 198/780 |
| 6,644,459 B2 | * | 11/2003 | van Leeuwen et al. | 198/370.1 |
| 6,729,463 B2 | * | 5/2004 | Pfeiffer | 198/460.1 |
| 6,772,874 B2 | * | 8/2004 | Yamashita et al. | 198/781.03 |
| 6,860,381 B2 | * | 3/2005 | Newsom et al. | 198/781.05 |
| 6,868,961 B2 | * | 3/2005 | Ehlert et al. | 198/781.04 |
| 2002/0008007 A1 | | 1/2002 | Thomas | |

FOREIGN PATENT DOCUMENTS

| | | |
|---|---|---|
| DE | 2 117 959 | 9/1972 |
| DE | 2519374 | 11/1976 |
| DE | 37 20 609 | 1/1989 |
| EP | 0372 854 | 6/1990 |
| EP | 0372 9854 | 6/1990 |
| EP | 1 132 321 | 9/2001 |

* cited by examiner

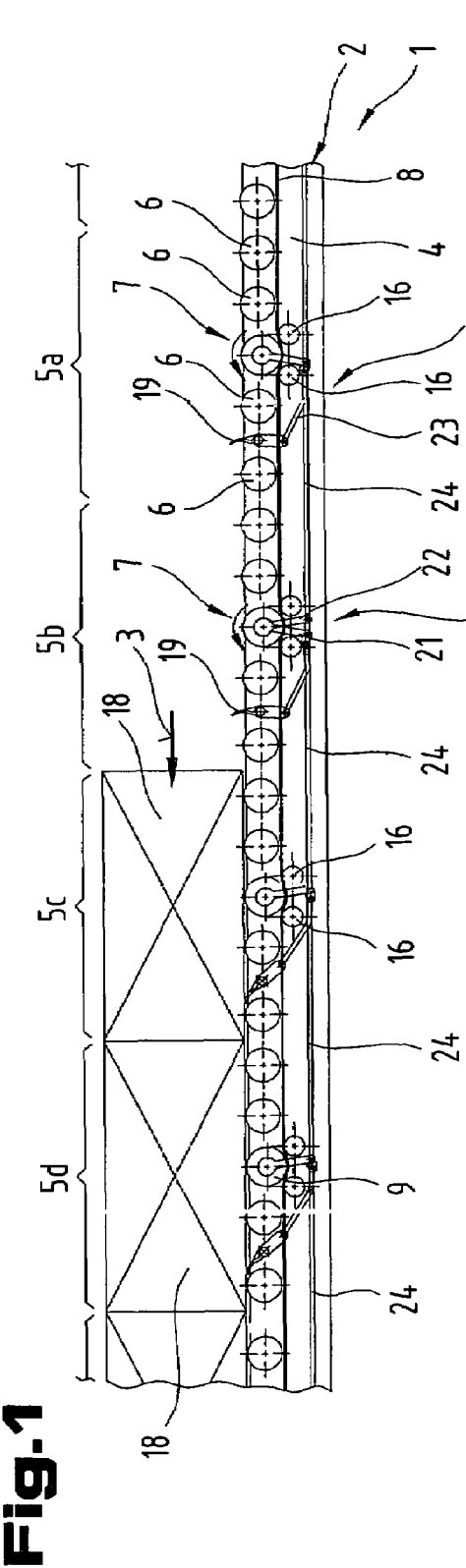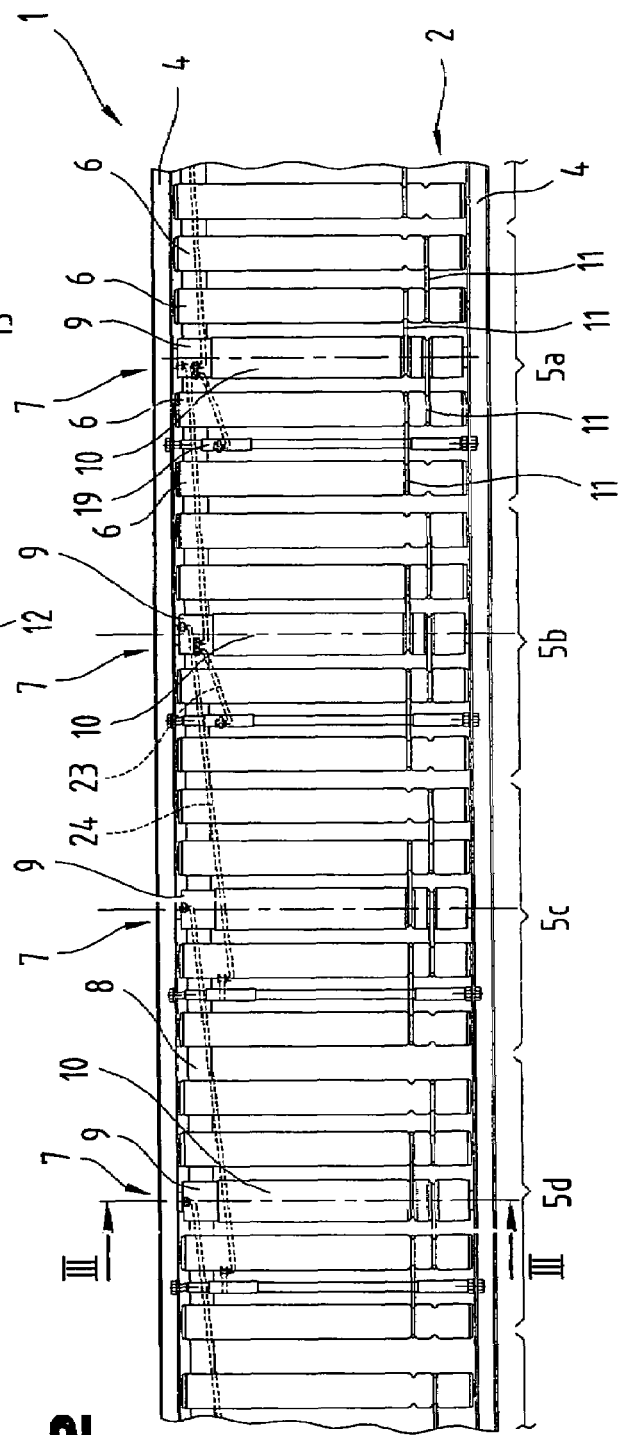

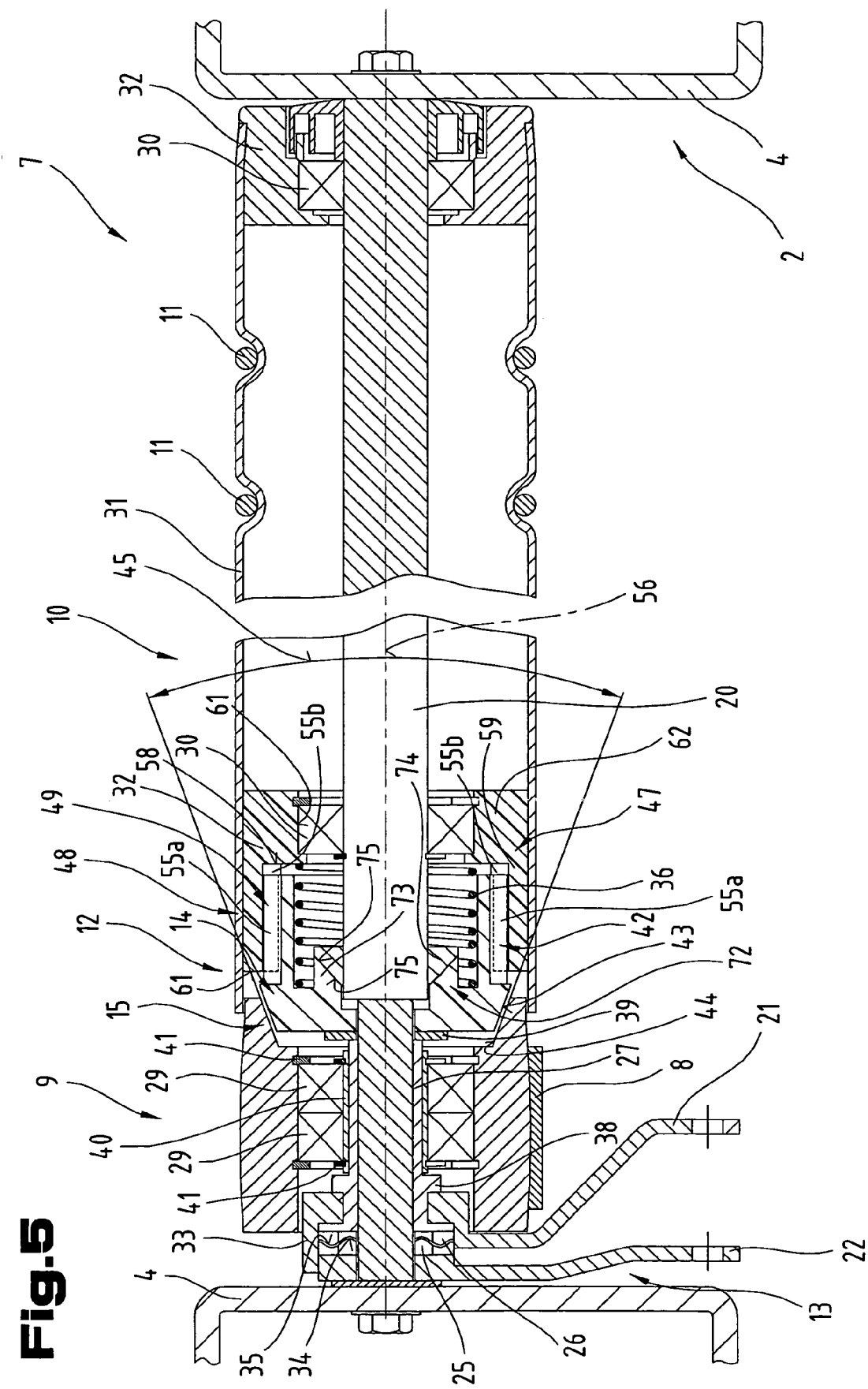

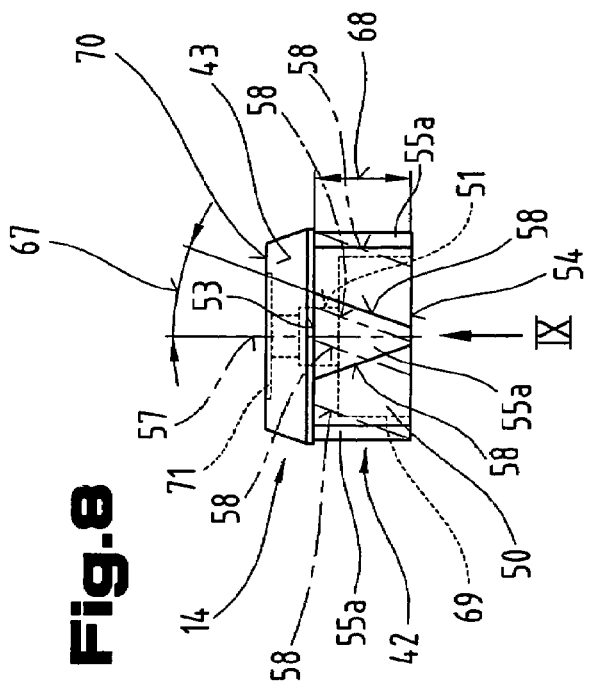
Fig.8
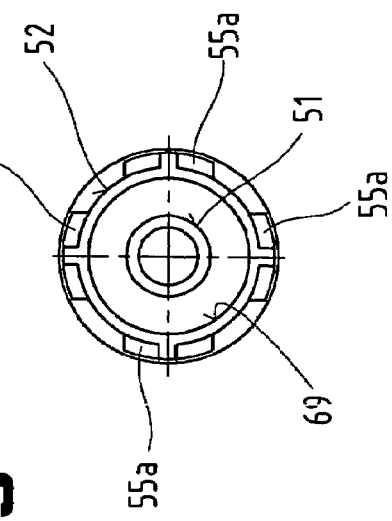
Fig.9
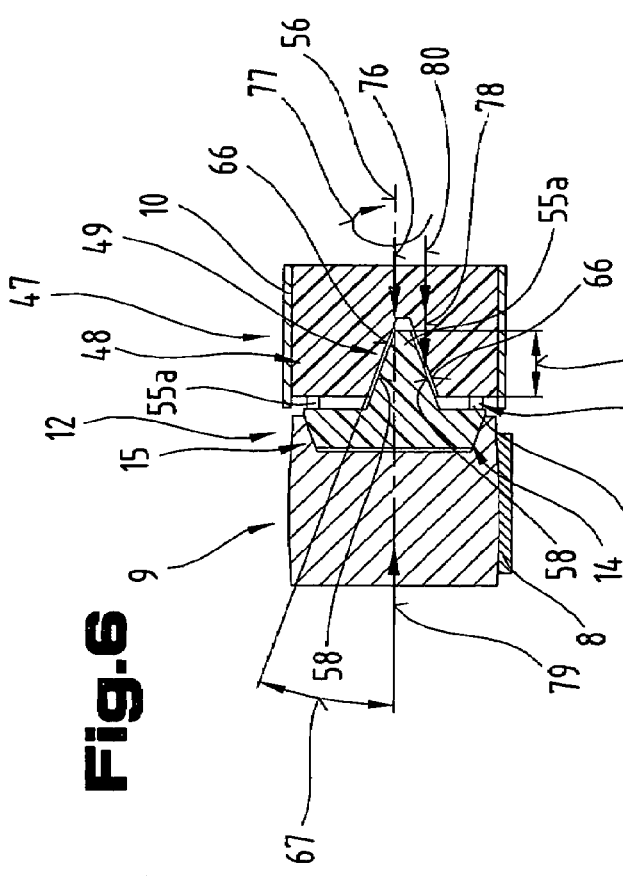
Fig.6
Fig.7

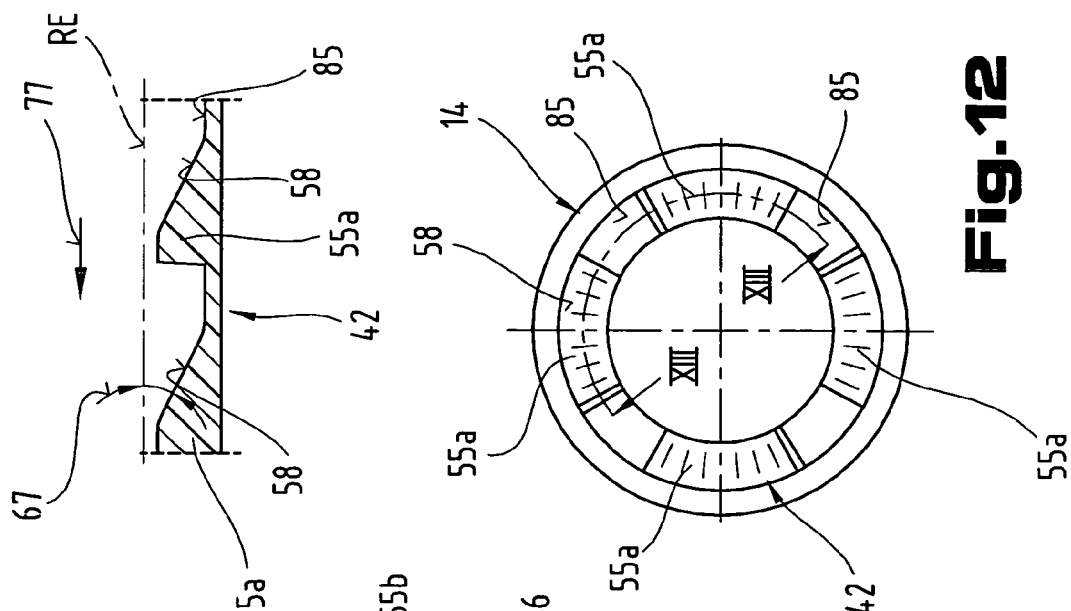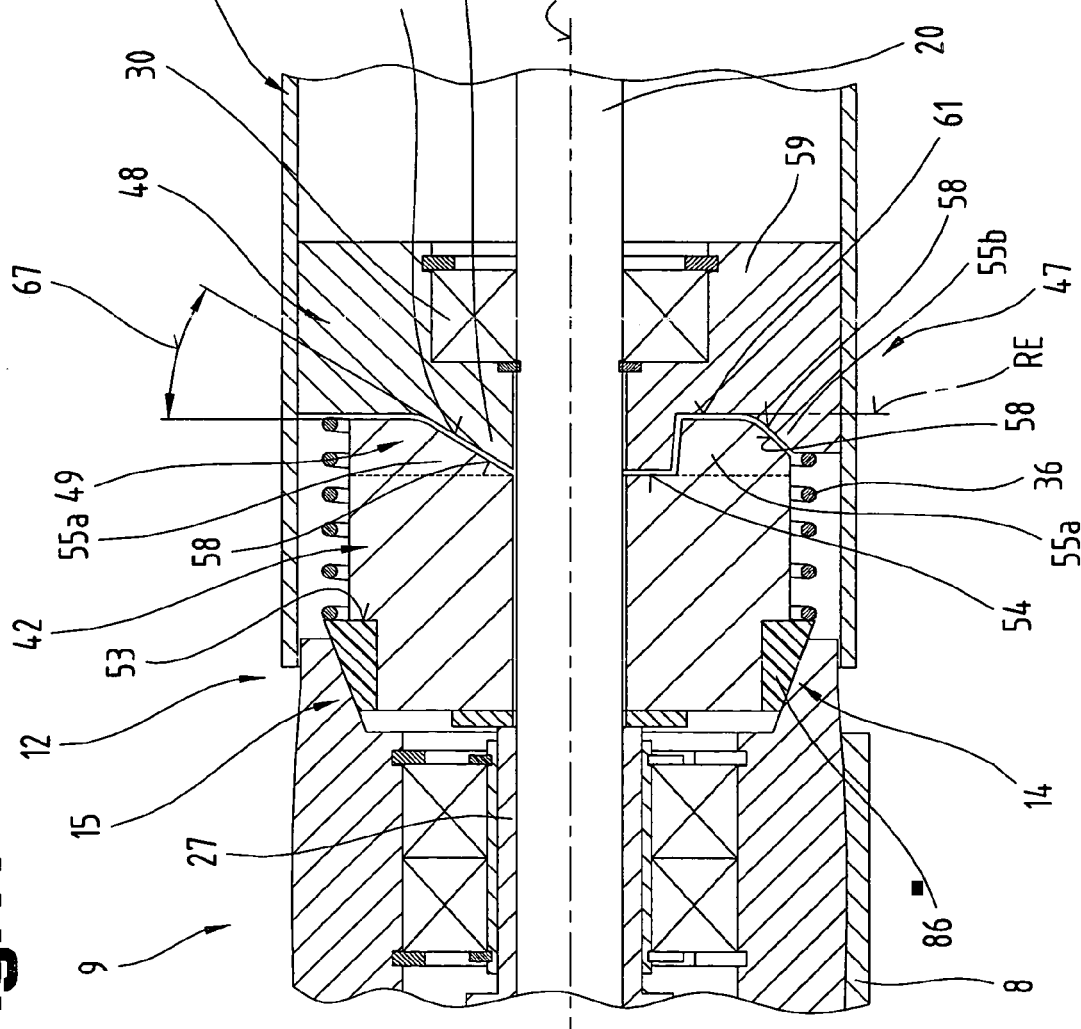

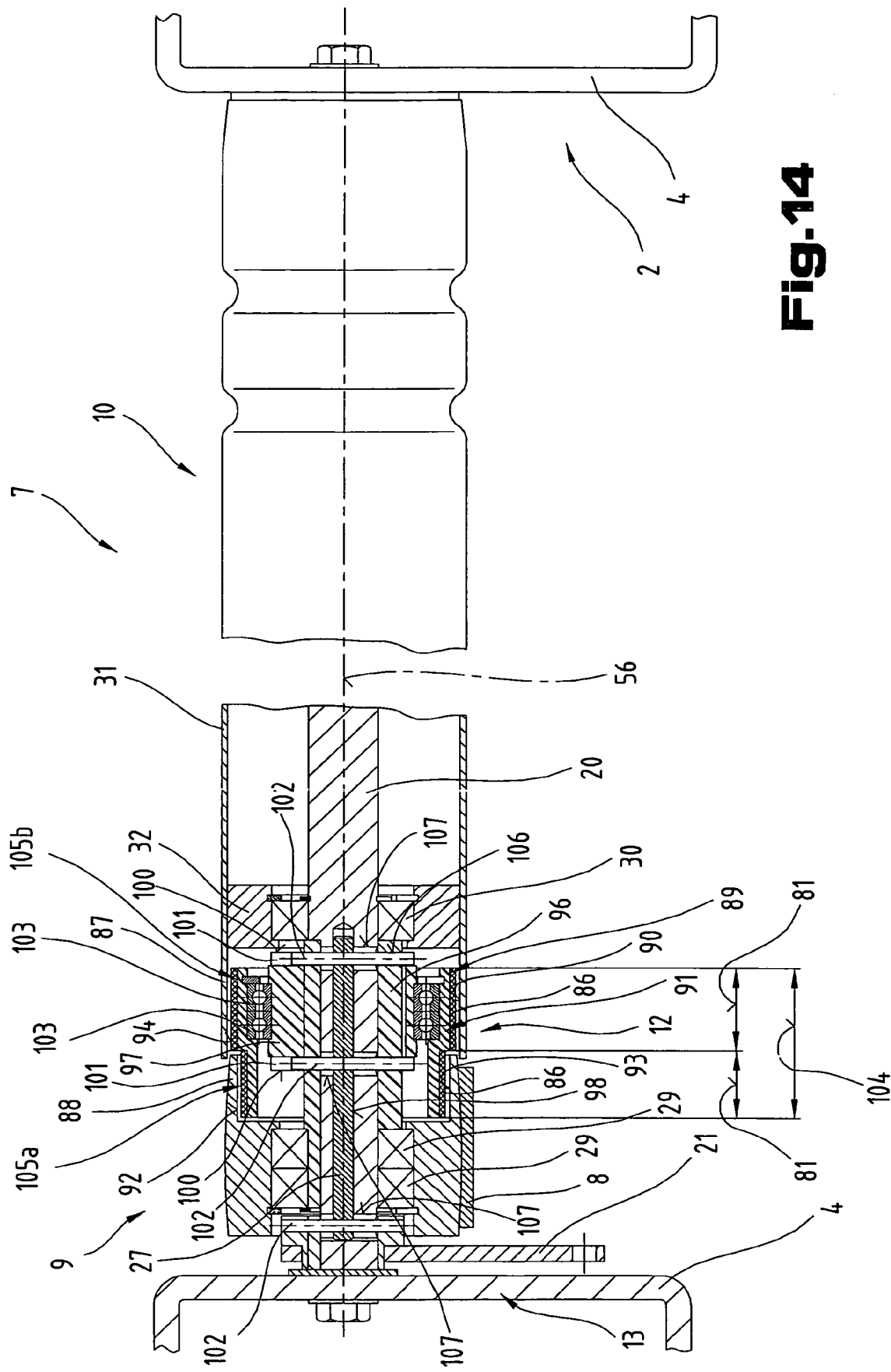

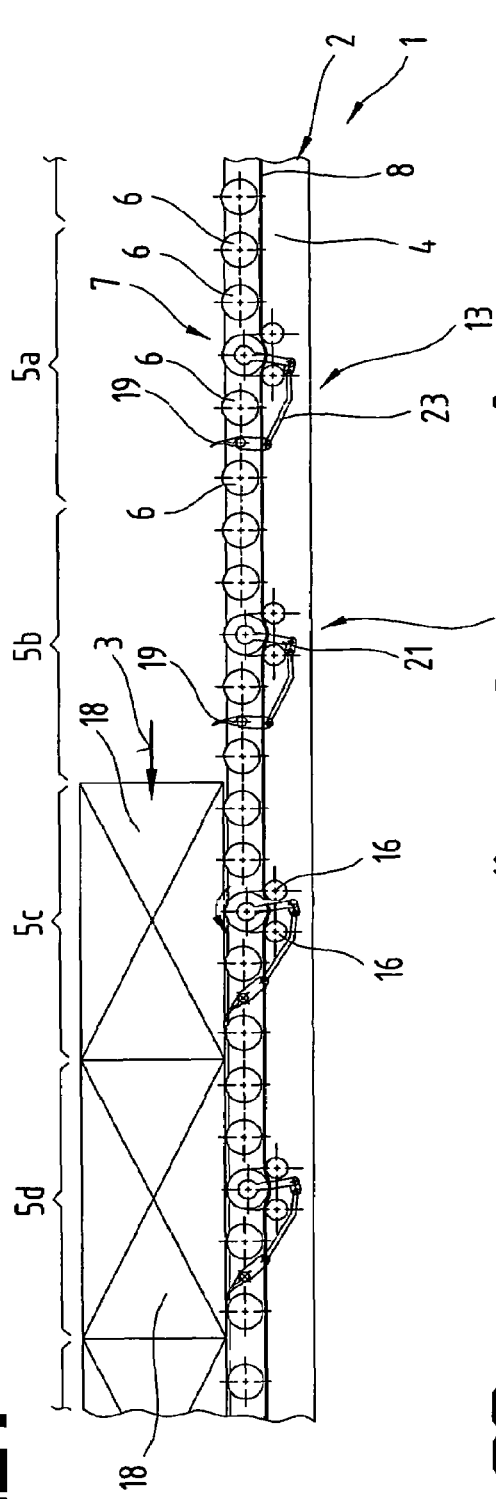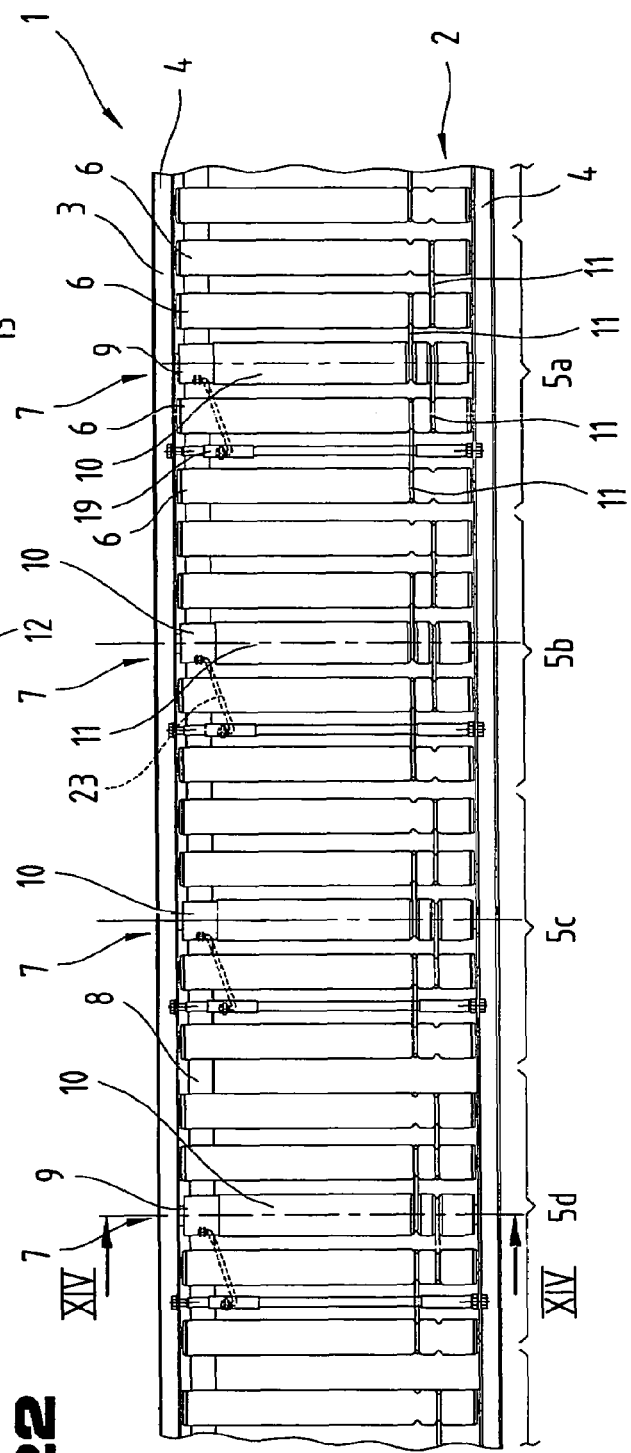

ROLLER ARRANGEMENT FOR AN ACCUMULATING ROLLER CONVEYOR

CROSS REFERENCE TO RELATED APPLICATIONS

Applicant claims priority under 35 U.S.C. §119 of Austrian Application No. A907/2002 filed on JUN. 14, 2002. Applicant also claims priority under 35 U.S.C. §365 of PCT/AT03/00166 filed on JUN. 6, 2003. The international application under PCT article 21(2) was not published in English.

The invention relates to a roller arrangement for a stowing roller conveyor as well as to a stowing roller conveyor.

Stowing conveyors are frequently employed for storing and conveying piece goods without pressure, and comprise rotationally supported conveying rollers, which are combined in conveying zones, whereby provision is made in each conveying zone of a roller arrangement for a conveying roller that is adapted so it can be driven and/or braked, if necessary.

A stowing roller conveyor with a multitude of conveying rollers installed in a support frame, is known from EP 1 132 321 A. Such conveying rollers are assigned to a number of conveying zones, and a conveying roller adapted to be driven and/or braked, if necessary, is allocated to each conveying zone, and coupled with the other rollers in the same conveying zone. The conveying rollers capable of being driven and/or braked each are mounted on a stationary roller axle, on which a driving roller is arranged that can be coupled via an electromechanical clutch with the roller that can be driven and/or braked. The latter roller is in turn equipped with an electromechanical brake system. The driving roller assigned to each conveying zone and adapted to be coupled with the drivable and brakable conveying roller via an electromechanical braking system, is in driving connection with an endlessly revolving driving element, e.g. a belt or chain extending over the length of the stowing roller conveyor. The electromechanical clutch is formed by a ring magnet, which is connected with the roller axle and adapted to revolve with the latter, and an armature connected with and adapted for revolving with the drivable and brakable conveying roller, and is axially displaceable on said conveying roller. The clutch and brake system is controlled via sensors detecting the state of occupation of each conveying zone, e.g. sensors in the form of hinged switching flaps, optical light barriers etc., protruding into the path of movement of piece goods. Such known stowing roller conveyors have been most successfully employed in practical applications; however, said rollers require increased controlling and switching expenditure.

Another design of a roller arrangement for conveying piece goods along a stowing roller conveyor is known from U.S. Pat. No. 5,810,157 A. This roller arrangement is comprised of a driven shaft; an inner sleeve secured on said shaft; a conveying roller secured on said sleeve via a friction grip element; as well as a safety nut, which is axially adjustable on the inner sleeve via a screw thread arrangement. The safety nut is provided with a clamping ring, and the inner sleeve with a protruding element extending radially over the circumference. The protruding element and the clamping ring have friction surfaces complementing and engaging one another. A cylindrical jacket surface of the clamping rings borders on an inner surface of the conveying roller, Friction grip between the inner sleeve and the conveying roller is generated depending on the weight of the transported piece goods, so that the frictional force between the inner sleeve and the conveying rollers rises with the increase in weight of the piece goods, so the conveying roller is driven jointly with the inner sleeve and inner surface of the conveying roller. In addition, the engagement of the clamping ring with the inner surface of the conveying roller generates an additional friction grip or frictional force that is generated independently of the weight of the transported piece goods as the latter are displaced along the stowing roller conveyor. Owing to the arrangement of the clamping ring, it is now possible to transport objects with relatively low weights, because the driving force is now be transmittable from the driven shaft and inner sleeve to the conveying roller via the clamping ring.

Roller arrangements for a stowing roller conveyor are known as well from DE 37 20 609 A and DE 2 117 959 A. Said roller arrangements comprise a drivable conveyor roller that is rotationally supported in a support frame of the stowing roller conveyor on a stationary roller axle, and a driving gear arranged on one side of the roller, particularly a chain sprocket wheel, as well as a clutch comprised of two clutch components, which are adjustable in relation to one another and disposed between the conveying roller and the driving sprocket wheel. Said clutch allows the conveying roller to slip versus the sprocket wheel. According to DE 37 20 609 A, one of the coaxial components of the clutch is provided with a conical support surface that can be engaged with a coaxial recess with a conical inner surface of the other component of the clutch. At least one component of the clutch, which is axially moving on the roller axle, is forced against the other component of the clutch via a spring element. The frictional torque transmittable from the sprocket wheel to the conveying roller is dependent upon the pretension of the spring element.

Furthermore, a roller arrangement is known from EP 0 372 854 A1, which is comprised of a shaft rotationally supported in a support frame; a conveying roller connected with the shaft and fixed thereon for rotating with the shaft; a chain sprocket wheel rotationally supported on the shaft; as well as a clutch system arranged between the shaft and the sprocket wheel. The clutch device is designed as a slip clutch and comprises two clutch components, which are designed for complementing and engaging one another through friction grip. The first clutch component is arranged coaxially with the shaft and connected fixed on the driving wheel for jointly rotating with the latter, and the second clutch component is arranged on the shaft and axially adjustable on the latter. The coupling surface of the second clutch component is pressed against the coupling surface of the first clutch component with constant spring force. When a torque value set for the spring force is exceeded, the friction grip acting between the two clutch components is released, and the first clutch component slips through versus the second clutch component.

Furthermore, a roller arrangement for a stowing roller conveyor is known from DE 25 19 374 A. This arrangement is comprised of a driving gear arranged on a stationary roller axle, and a conveying roller that can be coupled with and uncoupled from said driving gear via a claw clutch. The clutch comprises a clutch member that is axially displaceable in relation to the roller axle via a clutch lever and a counter clutch member. This roller arrangement known from the prior art is afflicted with the drawback that the clutch components designed for complementing each other for the driving connection between the driving gear and the drivable conveyor roller can be coupled only within predefined limits of spacing.

All roller arrangements where clutch components are employed between the driving and the drivable conveying rollers and act through friction grip by pressing such rollers one against the other via a spring element, are afflicted with the drawback that for obtaining a slip-free drive between the driving and drivable conveying rollers, the spring element generating the force of contact pressure between the clutch components has to be dimensioned for the maximum weight of piece goods to be transported, which requires high switching force for shifting at least one component of the clutch from a position in which it is engaged, into a position in which it is disengaged. Such shifting force has to be exerted by the piece goods that depress the switching flap and generate such switching force. This means that the piece goods to be transported have to have a high minimum weight so as to be capable of shifting the clutch device. Therefore, both the clutch and adjusting devices such as switching flaps or shifting lever systems, or shifting elements etc., have to be designed ruggedly, which means such known stowing roller conveyors are capable of adequately covering only a limited field of application due to the inertia conditioned by their systems.

The present invention is based on the problem of providing a roller arrangement for a stowing roller conveyor, by virtue of which the known drawback of high shifting force for actuating the clutch system is avoided; the driving torque is reliably transmitted from the driving roller to the conveying roller; and whereby such a roller arrangement is characterized by the simplicity of its structure. Irrespectively of the above, the problem of the invention is to utilize in a superior manner the space in the driving and conveying rollers, such space being available, to begin with, and to permit unrestricted application of the roller arrangement even under the severest operating conditions.

The problem of the invention is resolved by a roller arrangement for conveying piece goods along a stowing roller conveyer in accordance with the invention. Surprisingly, benefits are obtained in this connection in that a self-adjusting setting device depending on the load moment is arranged between the conveying roller and a first component of the clutch, via which such first clutch component can be pressed against the other clutch component with a force of contact pressure exceeding the low spring force, with self-adjustment to the minimum weight of the piece goods to be transported. This permits slip-free engagement between the clutch components, or the transmission of driving torque from the driving roller to the conveying roller even when transporting piece goods with highly varying weights, on the one hand, and keeping the shifting force required for uncoupling one of the clutch components low, on the other hand. Arranging the clutch device and the load-dependent setting device within and between the driving and conveying rollers, is advantageous as well in that said rollers are protected in this way from external influences such as fouling over their entire useful life, and, furthermore, permits superior utilization of the interior space available in the driving and conveying rollers, to begin with.

A preferred embodiment permits a small structural design of the roller arrangement, and reliable actuation of the clutch system.

Another embodiment is beneficial in that the force of contact pressure is infinitely variable in a simple manner within the limits of minimum and maximum weight values of the piece goods, depending on the weight of the piece goods to be conveyed. Furthermore, it is advantageous in that at least one of the transmitting elements is automatically adjusted without requiring external energy, and thus without any drive, to an extent depending on the weight of the piece goods; in that an equilibrium is adjusted between the driving torque of the driving and conveying rollers; and in that the drive torque is transmitted from the driving to the conveying roller free of any slip. Owing to such selfreadjusting effect of the setting device, wear of the clutch device caused by friction can be substantially reduced, and the service or useful life of the clutch can be prolonged.

A further embodiment is advantageous in that transmission elements of the setting device, such elements being arranged one in the other and adjustable in relation to each other, are inserted in the standard-type conveying roller, which permits realizing a simple structure of the setting device.

With a further embodiment, it is possible to manufacture the transmission elements in a simple manner, for example by employing the injection molding process.

According to a further embodiment, the number of individual components is reduced further, and a compact design is obtained.

In a further possible embodiment the modular structure of the setting and clutch devices permits simple exchangeability of individual components of the construction. In this connection, the first clutch component is axially displaceably supported on the roller axle and/or rotationally supported on said axle in the peripheral direction.

A further embodiment permits the force of contact pressure exerted by the first clutch component to automatically readjust itself vis-a-vis the other clutch component, on the one hand, and/or, on the other hand, if an adjustable maximum value of the transmittable torque between the transmission elements is exceeded, e.g. when conveying piece goods with impermissible weights, permits to transmit to the transmitting element and the first clutch component the overload moment via the engaged transmitting elements free of any destructive effects. In any such case, the setting device comprising at least two transmitting elements, forms a safety clutch.

Other embodiments, however, are beneficial as well in that it is possible with such embodiments to adjust the variable force of contact pressure, which is self-adjusting to the weight of the piece goods to be transported, via a helical set of gears that can be produced in a simple manner.

According to beneficial further embodiments of the invention, a simple manufacture of the transmission elements is achieved with longitudinal grooves and/or tooth elements, which are adapted to complement one another.

By virtue of further embodiments of the invention, it is possible to optimally adjust the transformation of the force ratio between a load-dependent tangential force of the piece goods, and the force of contact pressure acting between the two components of the clutch.

It is assured according to a further embodiment that the adjustable transmitting elements, which are guided one in the other in the way of a screw line, are connected with each other in terms of movement both in their engaged and disengaged switching positions, and particularly connected with each other in a movingly fixed manner, and are capable of reacting within a short time to torque variations caused by transported piece goods with varying weights.

The design according to a further embodiment contributes to the rugged structure of the roller arrangement.

A further embodiment of the invention permits the spring element to be accommodated in a space-saving manner, and to centrally transmit the force component and the axial force adjusted to the weight of the piece goods, to the first clutch component, which allows avoiding wear conditioned by friction due to any one-sided engagement between the coupling or friction surfaces of the two components of the clutch.

However, another embodiment is beneficial as well in that, for example the adjustable first transmitting element has a brake extension which, when the first clutch component is set from its shifting position in which it is engaged, to the one in which it is disengaged, engages a braking block fixed on the roller axle, so that the piece goods, which are supported on the roller arrangement to some extent, are quickly slowed down when conveyed at high rates of advancement, and any impact between two pieces of goods can be kept to a minor extent, if piece goods transported one after the other in tight succession, are backing up, so that damage to the piece goods can be avoided. It is beneficial, furthermore, that the brake extension serves at the same time as a guide for the at least one spring element, particularly the cylindrical pressure spring.

A further embodiment contributes to the robustness of the construction of the roller arrangement.

According to a further embodiment, an optimal opening angle is found for the surfaces of the clutch complementing and engaging each other.

Further embodiments of the invention are beneficial as well in that the force of contact pressure between the two clutch components depending on the weight of the piece goods to be transported, is automatically adjusted via the setting device until slipfree frictional grip has been set. Furthermore, the setting device is characterized by its small structural size, so that it can be accommodated in the conveying roller, which preferably has a standard diameter, for example of 50 mm.

The problem of the invention, however, is solved also by the features discussed below. The surprising advantage gained is that owing to integration of the coupling components of the clutch system in the driving and/or conveying rollers, the shifting distance for shifting at least one clutch component versus the other clutch components, from a position in which it is disengaged, to one in which it is engaged, can be kept short, and high reliability of the function of the clutch system is achieved by keeping dirt away from it.

A further embodiment is beneficial in that the shifting force of the setting device is directly transmitted by a shifting lever to a setting lever rotationally supporting the transmitting roller, which further reduces the adjusting distance.

Further embodiments are found to be advantageous in that the driving torque can be transmitted without slip from the driving roller to the conveying roller even if the force of contact pressure exerted by the transmitting roller on the coupling surfaces of the driving and conveying rollers is low.

A further embodiment is beneficial in that the transmitting roller can be set from the shifting position engaging it, to one in which it is disengaged, even at small angles of swivel, which allows for short shifting times.

Finally, the problem of the invention is resolved also by a stowing roller conveyor in accordance with the invention. The benefit surprisingly gained is that the roller arrangement applicable with the aforementioned advantages, contributes to a simple structure of the stowing roller arrangement, and substantially reduces the force required for shifting the clutch system, permitting in turn smaller dimensions of the setting device initiating the shifting force.

The invention is explained in greater detail in the following with the help of the exemplified embodiments shown in the drawings, in which:

FIG. 1 is a schematic side view of a cutout from a stowing roller conveyor as defined by the invention.

FIG. 2 is a top view and highly simplified schematic representation of the stowing roller conveyor according to FIG. 1.

FIG. 5 shows a longitudinal section and highly simplified schematic representation of the roller arrangement according to FIG. 3, with the clutch in the shifting position in which it is disengaged.

FIG. 6 shows a longitudinal section and highly simplified schematic representation of a driving roller and a part area of the conveying roller; of the clutch device between said rollers in the shifting position in which it is engaged, as well as of the setting device arranged between the clutch, particularly between the first clutch component and the conveying roller.

FIG. 7 is a longitudinal section and highly simplified schematic representation of a driving roller and a part area of the conveying roller; of the clutch device arranged between said rollers in the shifting position in which it is disengaged, as well as of the setting device arranged between the clutch, particularly between the first clutch component and the conveying roller.

FIG. 8 is a schematic and highly simplified schematic representation of the first transmitting element as defined by the invention, with a view of the first clutch component.

FIG. 9 is a view of the transmitting element with the clutch component according to arrow IX in FIG. 8.

FIG. 11 shows a longitudinal section and highly simplified schematic representation of yet another design variation of the roller arrangement as defined by the invention, with another embodiment of the setting device with its transmitting elements being engaged with each other; as well as of the clutch device.

FIG. 12 is a face view and highly simplified schematic representation of the first transmitting element, with the first clutch component connected with said element.

FIG. 13 is a highly simplified view and schematic representation of a part of a tooth system of the transmitting element viewed in the direction indicated by the arrows XIII-XIII in FIG. 12.

FIG. 14 is a highly simplified schematic representation of another embodiment of the roller arrangement as defined by the invention, with the clutch device shown in the shifting position in which it is disengaged; with a section according to lines XIV-XIV in FIG. 22.

FIG. 21 is a schematic cutout of yet another embodiment of a stowing roller conveyor, with the roller arrangement according to FIGS. 14 to 19 shown by a side view; and FIG. 22 is a top view of the stowing roller conveyor according to FIG. 21, shown by a highly simplified representation.

Figure 3:
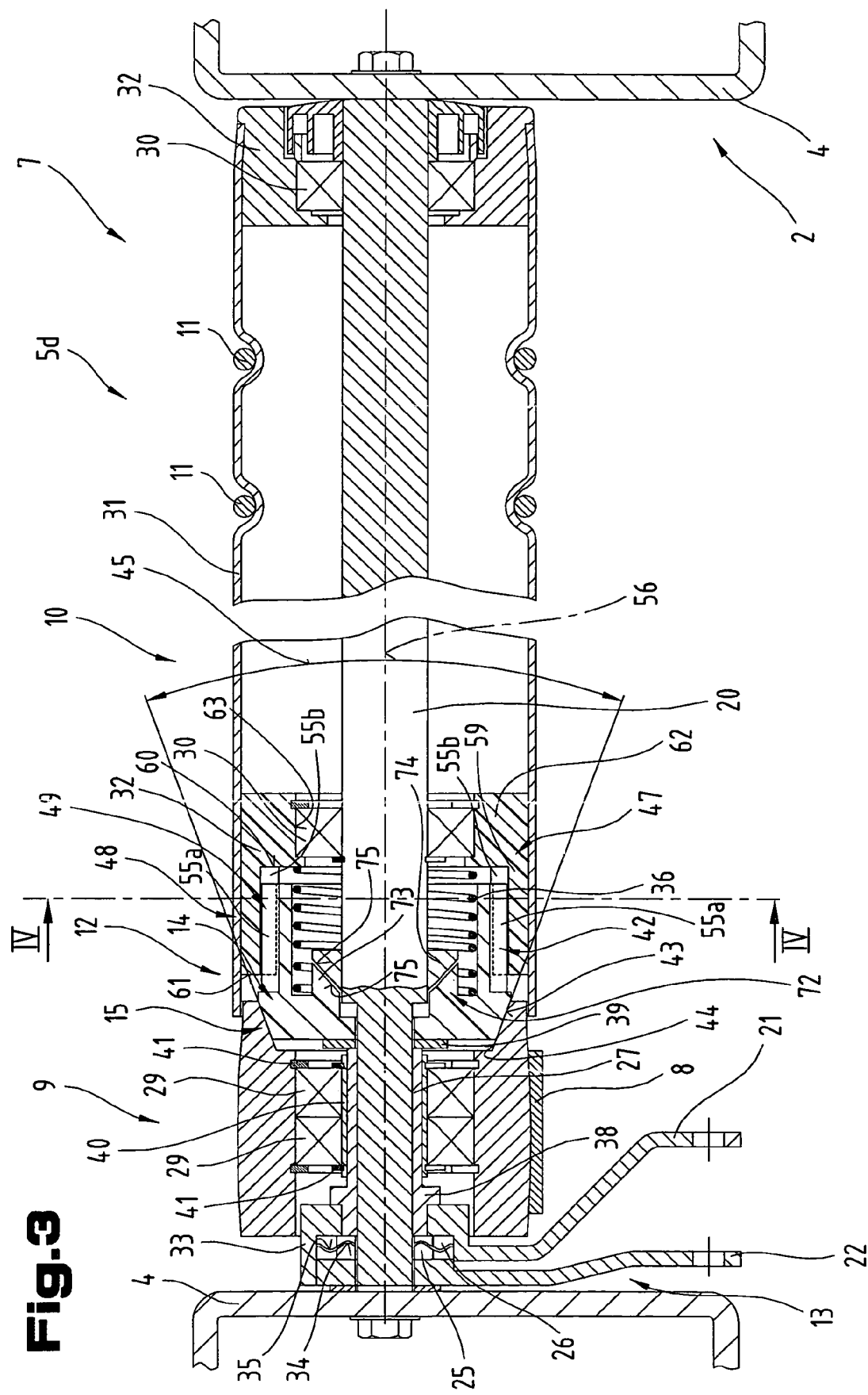
FIG. 3 is a highly simplified schematic representation of a roller arrangement as defined by the invention of a conveying zone of the stowing roller arrangement, comprising a driving roller and a conveyor roller, and a clutch device between said rollers in the shifting position in which said clutch is engaged, with a section according to the lines III-III in FIG. 2.
Figure 4:
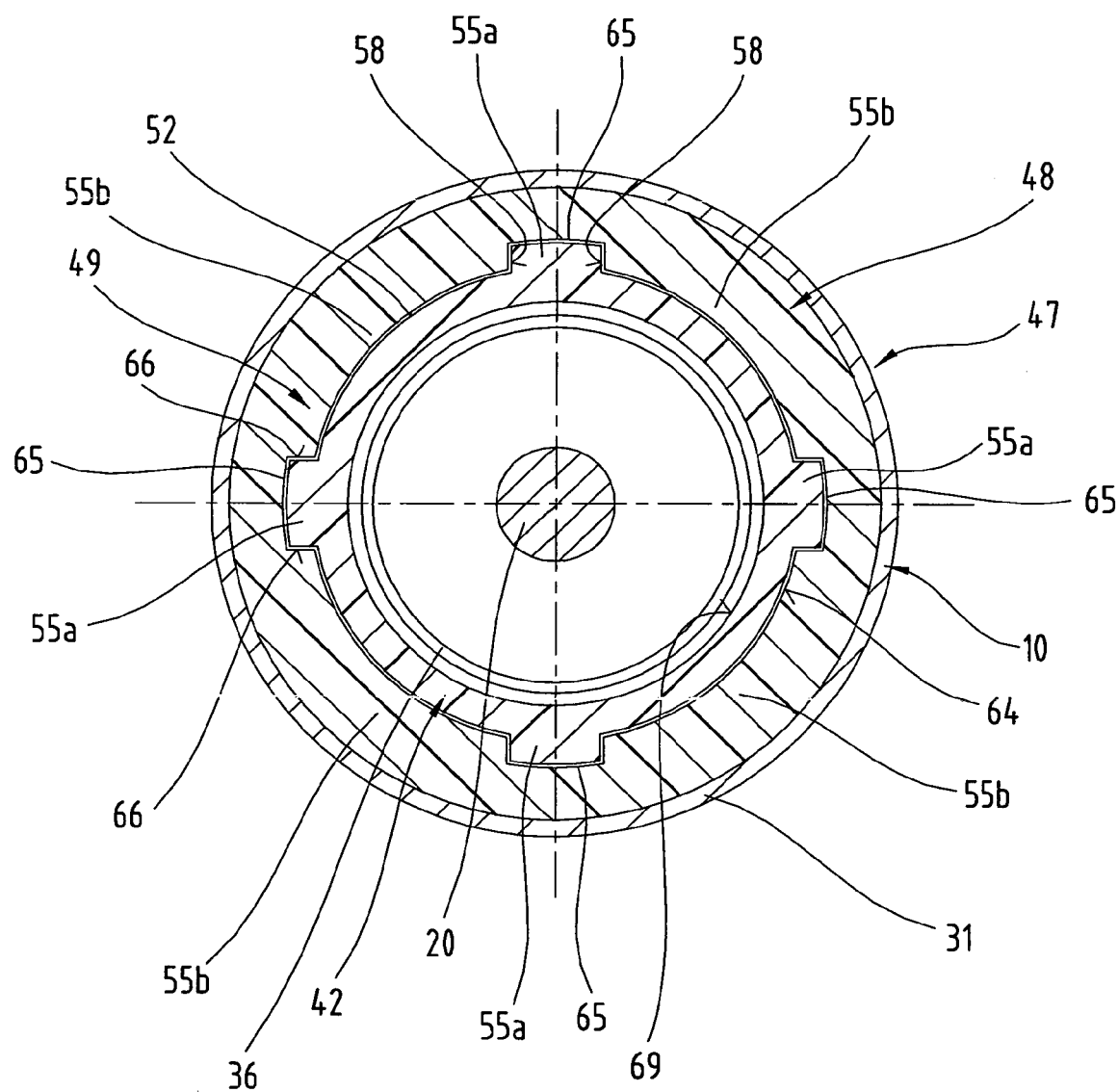
FIG. 4 is a sectional view of a conveying roller, showing the transmitting elements engaged, with a section along the lines IV-IV in FIG. 3.

It is noted by way of introduction that in the various exemplified embodiments described herein, identical components are provided with identical reference numerals and identical component designations, whereby the disclosures contained throughout the present specification can be applied in the same sense to identical components with identical reference numerals and identical component designations. Furthermore, data relating to position such as, e.g. "at the top", "at the bottom", "laterally", etc. pertain to the directly described and shown figure, and, where a position has changed, are applicable in the same sense to the new position. Moreover, individual features or combinations of features of the various exemplified embodiments shown and described herein may per se represent independent inventive solutions and solutions as defined by the invention.

FIGS. 1 to 5, which are jointly described herein, show a cutout from a stowing roller conveyor 1 by different views, and a roller arrangement. The stowing roller conveyor 1 is comprised of a support frame 2 with the two side parts 4, which extend in the conveying direction according to the arrow 3, and define the stowing roller conveyor 1 laterally. Said side parts are connected via a plurality of crossbeams (not shown), which are arranged spaced from each other in the direction of conveyance according to arrow 3, and thus are kept apart. The side parts 4 are realized in the form of C-shaped sheet metal sections, the bridges of which are aligned upright. In the conveying direction indicated by arrow 3, the stowing roller conveyor 1 is divided in a plurality of the conveying zones 5a to 5d, which are arranged one after the other. Each conveying zone 5a to 5d has a plurality of the non-driven rollers 6, and at least one roller arrangement 7, said rollers being mounted spaced from one another in the support frame 2, particularly in the side parts 4, viewed in the conveying direction according to arrow 3.

As it is explained herein in the following, the roller arrangement 7 comprises a driving element 9, e.g. a chain sprocket wheel or belt pulley, which is continually driven by a revolving, belt-like driving element 8, e.g. a chain or belt; and a conveyor roller 10 adapted to be driven and/or braked. The hollow-cylindrical conveyor roller 10 adapted to be driven and/or braked, is provided with groves extending across its periphery, in which endlessly revolving driving elements, particularly the belts 11 are guided, said belts rotating around the two adjacent conveyor rollers 10. The latter are drive-connected via the additional belts 11 with the additional conveying rollers 10 of the same conveying zone 5a; 5b; 5c; or 5d. A mechanical clutch system 12 particularly acting through friction grip, particularly a mechanically actuated friction clutch, e.g. a disk clutch, in particular a two- or multi-surfaced clutch, or a conical clutch, of the type shown in the following figures, is arranged between the driving roller 9 and the conveying roller 10. Such a clutch system comprises the clutch components 14, 15 as shown by way of example in FIG. 3, said clutch components being adjustable in relation to each other via at least one setting device 13.

FIG. 1 shows that the endlessly revolving driving element 8, e.g. a belt, is deflected in each conveying zone 5a to 5d within the range of each driving roller 9 of the roller arrangement 7 as defined by the invention, by the rollers 16 exerting contact pressure, and the driving roller 9, said driving element 8 encompassing said rollers at an angle in the range of 10° and 30°, e.g. of 20°.

According to FIGS. 1 and 2, at least one mechanical or optical sensor 19, particularly a switching flap protruding into the path of travel of the piece goods 18, or a photoelectric cell, e.g. a light barrier, is assigned to each conveying zone 5a to 5d, such sensor detecting the piece goods 18 transported as indicated by arrow 3, from the conveying zone 5a to the conveying zone 5d, such piece goods being shipped, for example packaged in auxiliary shipping materials such as cardboard boxes, or on pallets or in wooden boxes, etc.

In the present exemplified embodiment, the setting device 13 comprises the two swivel-mounted switching levers 21, 22, which are supported on a roller axle 20 of the roller arrangement 7; a first lever system 23 connecting the sensor 19 installed in each of conveying zones 5a; 5b; 5c; 5d, with the first switching lever 21; as well as another lever system 24 connecting the second switching lever 22 of each of the conveying zones 5a; 5b; 5c; 5d, with the conveyor zones 5d; 5c; 5b; 5a, which are arranged upstream in the conveying direction indicated by arrow 3. The lever systems 23 and 24 each are pivot-jointed with the hinged switching flaps, and with the switching levers 21 and 22, respectively. By wiring the conveying zones 5a to 5d with each other, the stowing process for storing the piece goods 18 can be controlled along the line of the stowing roller conveyor 1 in a targeted manner.

If, as shown in FIG. 1, the conveying zone 5d is occupied by a piece of goods 18, the switching flap in said conveying zone 5d is depressed by such item of piece goods 18; the switching lever 22 connected with said switching flap of said conveying zone 5d is actuated via the lever system 24 in the conveying zone 5c, the latter being located upstream of said conveying zone 5c in the direction of conveyance indicated by arrow 3; the fan-like disks 25, 26 arranged between the two switching levers 21, 22 shown in FIG. 3, which are described in greater detail further below, are adjusted relative to one another; the clutch system 12 remains non-actuated in its base position, where it is engaged or coupled in is switching position and remains non-actuated until another piece of goods 18 being advanced in the direction of conveyance (indicated by arrow 3) depresses the switching flap arranged in the conveying zone 5c. As soon as the switching flap arranged in the conveying zone 5c is depressed by the advancing piece of goods 18, the switching lever 21 connected with the switching flap in said conveying zone 5c, and the fan-like disks 25, 26 coaxially arranged on the roller axle 20, are adjusted in relation to each other in a manner such that they are apart in the direction of the roller axle 20, and the clutch components 14, 15, the latter being in a state of friction grip with each other, are adjusted by means of a sleeve-like switching element 27, i.e., said clutch components are shifted from their engaged or coupled shifting positions indicated in FIG. 3, into their disengaged or coupled shifting positions as shown in FIG. 5. In this switching process, the drivable conveying roller 10 is uncoupled from the driven driving roller 9, whereupon the conveying roller 10 and the other rollers 6 arranged in said conveying zone 5c, as well as the piece of goods 18 in said conveying zone 5c are stopped.

This process can be continued along the line of the stowing roller conveyor 1 in any desired manner.

It is noted at this point that the pieces of goods 18 are stowed not only directly abutting one another as shown in FIG. 1, but can be stowed also with a horizontal spacing between each other in the direction of conveyance indicated by arrow 13. The expert in this field is familiar with such methods, which is referred to as pressure-free storing and conveying of the piece goods 18.

As shown in FIG. 3 in a superior manner, the roller arrangement 7 is arranged on the roller axle 20 supported between the side parts 4 of the support frame 2, with the driving roller 9 and the drivable and/or brakable conveying roller 10 being supported on said axle via the bearings 29, 30, particularly ball bearings.

The conveying roller 10 is comprised of the cylindrical conveying roller jacket 31 with the conveying roller bottoms 32 arranged at its face ends. Said bottoms are provided with a bore extending coaxially with the roller axle 20. The bearings 30 for the conveying roller 10 are accommodated in said bore.

As already described above, the clutch components 14, 15 are adjustable relative to one another via the two switching levers 21, 22 pivot-mounted on the roller axle 20. The switching lever 21 adjoining the driving roller 9 has a pan-like receiving body 33, which is provided at its bottom with a bore for the roller axle 20, the latter extending through said bore. Furthermore, the other switching lever 22 disposed adjacent to the side part 4 is supported on the switching lever 21 via at least two fan-like disks 25, 26.

Each of the two fan-like disks 25; 26 is preferably rigidly joined with one of the switching levers 21, 22 and thus moving with the latter. In the present exemplified embodiment, the fan disk 25 is connected with the switching lever 22 pivot-mounted on the roller axle 20, and the fan disk 26 with the switching lever 21. The fan disk 25 has at least two, preferably four switching cams 34, which are arranged in the peripheral direction equally spaced from each other, and which change into axially recessed, parallel stop surfaces via wedge-shaped ramps slanted in the counter sense.

The fan disk 26 connected with switching lever 21, the latter being pivot-mounted on the roller axle 20 or the switching element 27, and displaceable in the axial direction relative to the roller axle 20, is provided with the switching cams 35, wedge-shaped ramps and stop surfaces complementing the fan disk 25.

When the two switching levers 21, 22 are swiveled against each other in the manner described above, by the depression the switching flaps, e.g. in the conveying zones 5d and 5c, the fan disks 25, 26 abutting each other in a base position, are displaced along the roller axle 20 in a direction axial in relation to the plane of movement of the switching levers 21, 22 as the angle of adjustment of the switching levers 21, 22 is increasing, and the first clutch component 14 axially displaceable on the roller axle 20, is adjusted against the action of at least one spring element 36, from a switching position in which it is coupled, as shown in FIG. 3, into a switching position in which it is uncoupled, as shown in FIG. 5. The hollow-cylindrical or tube-like switching element 27 in the form of a type of flanged or collared sleeve, which is slideably supported on the roller axle 20 and displaceable in the axial direction, and transmitting the switching force of the setting device 13, is arranged between the switching lever 21, the latter being axially adjustable on the roller axle 20, and the clutch component 14 that is axially adjusted on the roller axle 20 against the action of the spring force. A collar 38 extending all around is formed in a front end area disposed opposite the first clutch component 14, and the switching lever 21 is pivot-mounted between said collar and the front side on the tube section. A support disk 39 is usefully coaxially arranged on the roller axle 20 between the clutch component 14 and the switching element 27.

A hollow-cylindrical journal-bearing bushing 40 is arranged on the switching element 27, and axially fixed versus the axially adjustable switching element 27 and the driving roller 9 via the safety rings 41 and the bearings 29.

According to the exemplified embodiment shown in FIG. 3, the first clutch component disposed coaxially with the roller axle 20 has a rotationally symmetrical first transmitting element 42 still to be described in detail in the following, said transmitting element being molded onto said clutch component, forming one piece with the latter. Furthermore, it has a clutch surface 43 conically tapering in the direction of the driving roller 9. Furthermore, a second clutch component 15 adaped to complement the first clutch component 14, is formed by a recess arranged deepened on a front side facing the conveying roller 10, said recess having a coupling surface 44 expanding conically in the direction of the conveying roller 10. The opening angle 45 measured between the coupling surfaces 43 and 44 amounts to between 5° and 50°, e.g. to 30°.

At least one setting device 47 is arranged between the displaceable clutch component 14 and the drivable and/or brakable conveying roller 10. In the present exemplified embodiment, said setting device is designed in such a manner that at least the first transmitting element 42 is coaxially arranged within the rotationally symmetrical additional transmitting element 48, the latter being connected with and fixed on the drivable and/or brakable conveying roller 10 and moving with the latter; in a manner such that the first and the other transmitting elements 42 and 48, respectively, are displaceable against one another via a tooth system 49 in the peripheral direction of the transmitting elements 42, 48, and a direction coaxial with the roller axle 20.

Viewing FIGS. 3 to 9 jointly, it is obvious that the first transmitting element 42, which is adjustable vis-à-vis the other transmitting element 48 along a type of spiral or screw line, is formed by a cylindrical basic body 50 and a through-extending opening 51 extending coaxially with the roller axle 20, and limited by the two front sides 53, 54. An outside circumference 52 of the first transmitting element 42, preferably the outer circumference of the basic body 50, is provided with an outer tooth system comprising at least two, preferably four tooth elements 55a arranged equally spaced from one another in the peripheral direction. In the direction of the longitudinal center axis 56 of the roller axle 20, or the longitudinal center axis 57 of the first transmitting element 42, the tooth elements 55*a* have the V-flanks 58 extending against one another slanted in relation to the longitudinal center axes 56, 57; or, as shown by dash-dotted lines in FIG. 8, V-flanks 58 extending in the direction of the longitudinal center axis 56 of the roller axle 20 or longitudinal center axis 57 of the first transmitting element 42, specifically parallel to each other and slanted in relation to the longitudinal center axes 56, 57.

The other transmitting element 48, which has the shape of a pot as shown in FIG. 3, is formed by a hollow-cylindrical basic body 59 having an inner tooth system with the tooth elements 55*b*, and a bottom 62 arranged on said tooth elements on one of its front sides 60 and 61. The bottom 62 has a bore 63 extending coaxially with the roller axle 20, said bore receiving the bearing 30 of the conveying roller 10. Furthermore, twisted longitudinal grooves 65 are arranged recessed on the inner circumference 64 of the hollow-cylindrical basic body 59, said grooves being disposed equally spaced from each other in the peripheral direction of the other transmitting element 48, and complement the tooth elements 55*a*. FIGS. 6 and 7 show that the longitudinal grooves 65, which are directed radially outwards in the direction of the conveying roller 10, and peripherally limited by the tooth elements 55*b*, have the V-flanks 66 extending inclined against one another and slanted relative to the longitudinal center axis 56 of the roller axle 20. The V-flanks 66 of the longitudinal grooves 65 correspond with the V-flanks 58 of the tooth elements 55*b*. If the tooth elements 55*a* are formed as shown by dash-dotted lines in FIG. 8, the V-flanks 66 are formed parallel to each other and inclined in relation to the longitudinal center axis 56 of the roller axle 20. This configuration, however, is not shown in greater detail. The V-flanks 58, 66 and the longitudinal center axes 56, 57 of the roller axle 20 or transmitting element 42, 48, jointly enclose an angle 67 of larger than 0°, particularly of between 5° and 50°, for example of 10°, 20°, or 30°.

On its front side 54 facing the further transmitting element 48, the first transmitting element 42 is provided with a circularly cylindrical recess 69 extending over part of the length 68, and the at least one spring element 36, particularly a pressure spring, is inserted in the recess 69 between the first transmitting element 42 and the other transmitting element 48, said spring element pointing in the direction of the roller axle 20. It is, of course, possible also to make provision for several spring elements 36 with different spring constants, arranged one after the other in the direction of the roller axle 20.

For space reasons, the first clutch component 14 may have a recess 71 also on its front side 70 facing the driving roller 9, such recess being formed coaxially with the roller axle 20 as shown in FIG. 8 by dash-dotted lines, for receiving the support disk 39.

The arrangement of a brake system 72 between the first transmitting element 42 connected fixed on and moving with the displaceable first clutch component 14, and the roller axle 20, represents a preferred design variation as well. Within the region of the recess 69, the first transmitting element 42 forms a brake extension 73 revolving coaxially with the roller axle 20. Said brake extension is engageable with a braking block 74, which is fixed on the roller axle 20 and rotating coaxially with the latter, whereby said brake extension 73 and said braking block 74 each are provided with the conical braking surfaces 75. The drivable conveyor roller 10 can now be braked in a manner such that when the first clutch component 14 is in its disengaged position, the brake extension 73 is pressed with its braking surface 75 against the braking surface 75 of the braking block 74 with the switching force exerted by the setting device 13, and the conveyor roller 10 is slowed down via the setting device 47, particularly via the transmitting elements 42, 48 engaging one another via the outer and inner sets of teeth. The switching position in which the first clutch component 14 is engaged, and the brake system 72 is not actuated, is shown in FIG. 3, and the switching position in which the first clutch component 14 is disengaged and the brake system 72 is actuated, is shown in FIG. 5.

The brake extension 73 can be usefully employed at the same time for guiding the at least one spring element 36 in the radial direction. The braking block 72 can be produced as one piece with the roller axle 20 or, as a separate component can be secured on the latter, e.g. by means of a shrink-on or glued or welded connection, etc.

The first clutch component 14, the first transmitting element 42 and the brake system 72 can be manufactured in the form of one piece from plastic, particularly from a thermoplastic, a thermosetting plastic such as, e.g. glass fiber-reinforced polyamide preferably with a glass content of 25%; or using polycarbonate; employing, for example the injection molding, fiber injection molding or extrusion methods. In another variation, the first transmitting element 42 is made of steel, and the first clutch component 14 is formed by a friction coating with a conical coupling surface 43 glued to the front 53 facing the driving roller 9. In the exemplified embodiment shown, the other transmitting element 48 is formed by plastic as well, particularly a thermoplastic, e.g. glass fiber-reinforced polyamide preferably having a glass content of 25%; polycarbonate, etc.

The jointly described FIGS. 6 and 7 explain the principle on which the load-dependent, self-adjusting setting device 47 arranged between the clutch system 12, particularly between the first clutch component 14 and the conveying roller 10, is functioning. In the interest of superior clarity, the driving roller 9, the other transmitting element 48, and the at least drivable conveying roller 10 are indicated only schematically.

With the setting device 47 as defined by the invention, it is now possible to transport piece goods 18 as shown in FIG. 1 on the stowing roller conveyor 1 with varying weights, e.g. 0.5; 5; 10; 30; 50; 80 kg; etc. With the clutch system 12 in its coupled or engaged position, the first clutch component 14 is pressed against the first clutch component 15 of the driving roller 9 as the piece goods 18 with a minimum weight of, e.g. 0.5 kg, are being transported, with a spring force dimensioned in accordance with the minimum weight of the piece goods 18 (indicated by arrow 76), and with a power component (indicated by arrow 78) triggered by the rotation of the drivable conveying roller 10 in the direction of rotation (indicated by arrow 77), said component of force acting on the V-flanks 58, 66 with a force of contact pressure adjusted to the weight of the piece goods 18. In the present case, the switching force (indicated by arrow 79) conforms to its minimum. The spring force and the force component (indicated by arrows 76; 78) act parallel to each other, and parallel to the longitudinal center axis 56.

However, if the weight of the transported piece goods 18 being engaged by and conveyed with the conveying roller 10 exceeds the minimum weight, an additional axial force (indicated by arrow 80) is added to the spring force and force component and adjusted on the wedge-like flanks 58 of the tooth system 49, by which the first clutch component 14 is pressed against the other clutch component 15 as the piece goods 18 are being transported on said conveying roller 10.

The axial force (indicated by arrow 80) set on account of the difference between the minimum weight and the added weight, and acting on the V-flanks 58 of the tooth system 49, or outer and inner tooth systems of the transmitting elements 42, 48, is directly proportional to the force of contact pressure acting between the two clutch components 14 and 15.

The axial force (indicated by arrow 80) is functionally dependent upon the weight of the piece goods 18 to be transported. The higher the weight of the piece goods 18, the higher will be the axial force (indicated by arrow 80), and thus will be the force of contact pressure acting between the two clutch components 14 and 15. The switching force (indicated by arrow 79) acting against the axial force (indicated by arrow 80) has to be applied only for a short time for uncoupling the clutch system 12, because the axial force (indicated by arrow 80) is cancelled as soon as the V-flanks 58 are disengaged.

Therefore, it is now surprisingly feasible that a force of contact pressure acting between the two clutch components 14 and 15 is automatically set within a pre-determinable weight range between the minimum and maximum weight of the piece goods 18 to be conveyed, so that slip-free transmission of the torque between the driving roller 9 and the conveying roller 10 is achieved at any time.

It is naturally understood that the coefficient of friction of the transmitting elements 42, 48, the latter engaging each other via the tooth system 49 and being adjustable against one another along a type of screw line, can be optimized through experimental determination of friction pairings.

FIG. 6 shows, furthermore, that the length 81, over which the transmitting elements 42, 48 cover each other, said elements being adjustable in relation to one another in the way of a screw line, corresponds with at least twice and preferably with a multiple of the axial distance of adjustment of the clutch component 14, the latter being adjustable in driving connection by the other clutch component 15 from is engaged switching position, in which it is in driving connection with said component 15, to a switching position in which it disengaged.

FIG. 6 shows the clutch system 12 in its disengaged switching position. The V-flanks 58, 66 extending inclined in relation to the longitudinal center axis 56, have a particularly beneficial effect as well in that in the course of displacement of the first clutch component 14 in the direction of the rotating conveying roller 10, a braking force is generated (according to arrow 82), and the conveying roller 10 can be slowed down at least slightly even before the brake extension 73 and the braking block 74 engage one another.

Figure 10:
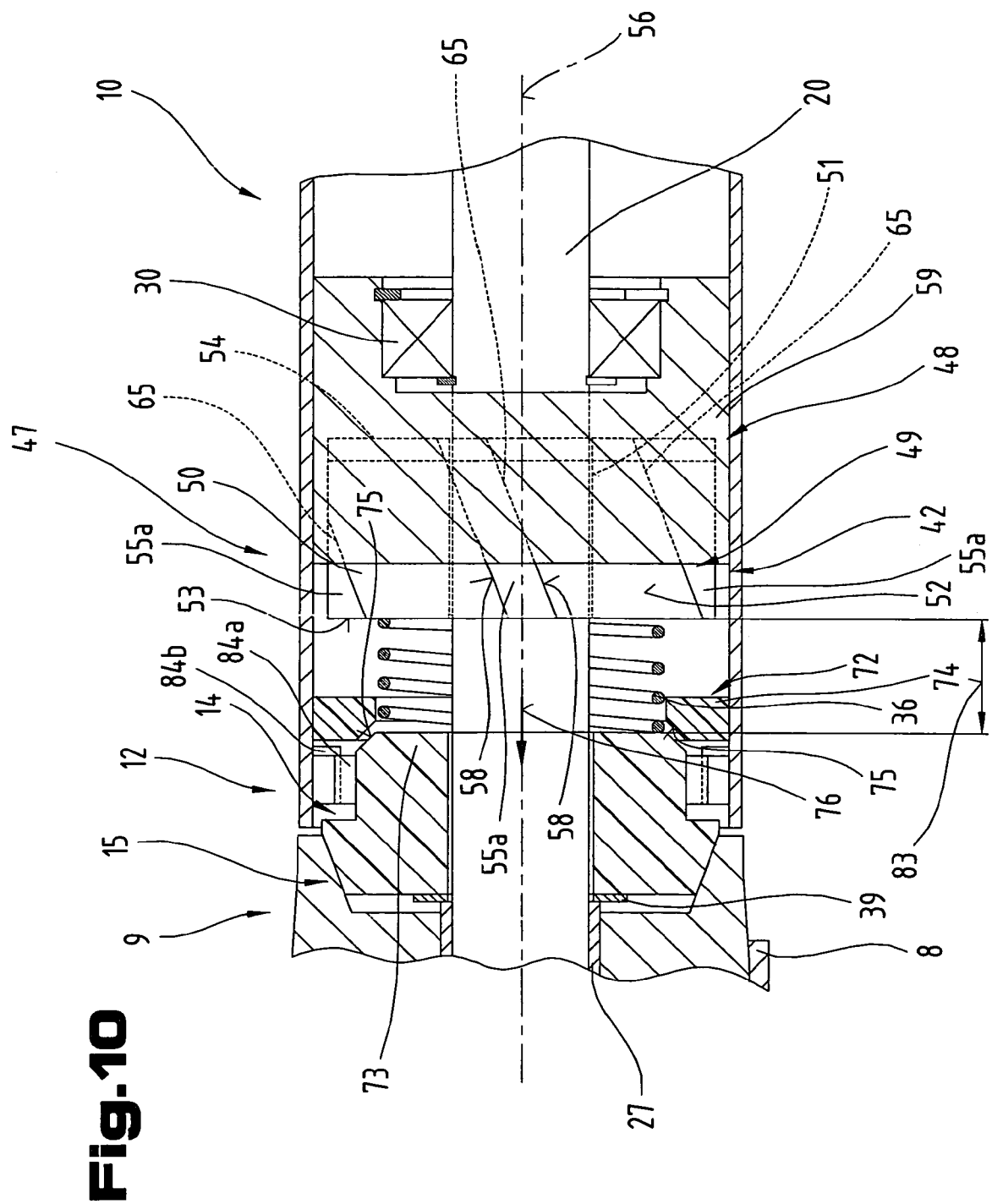
FIG. 10 shows a partly sectional and highly simplified schematic view of another embodiment of the roller arrangement as defined by the invention, and of another embodiment of the setting device, with its transmitting elements being engaged with one another; as well as of the clutch device.

FIG. 10 shows another design variation of the setting device 47, the latter being comprised of the mechanical transmitting elements 42, 48. Said elements engage each other via the tooth system 49 and are adjustable against one another in the axial direction relative to the roller axle 20, as well as in the peripheral direction. The first transmitting element 42 is formed by a cylindrical basic body 50 with the through-extending opening 51 extending coaxially with the roller axle 20, and limited by the two front sides 53, 54. On the outer circumference 52, the basic body 50 is provided with at least two, preferably four tooth elements 55a arranged equally spaced from each other in the peripheral direction. Said tooth elements are arranged recessed in the inner circumference of the other transmitting element 48, and guided in the peripherally limited longitudinal grooves 65. The other transmitting element 48 is pot-shaped and has already been described in detail above. The at least one spring element 36, particularly the pressure spring, is arranged centrally relative to the roller axle 20 between the first transmitting element 42 and the displaceable first clutch element 14, said two elements being separated from each other. When an item 18 of the piece goods exceeding the minimum weight has to be transported, a spacing 83 measured between the clutch component 14 and the first transmitting element 42 in the direction of the roller axle 20, is reduced by the first transmitting element 42 advancing in the direction of the first clutch component 14 in the way of a screw line, and the reduction of said spacing 83 causes the spring force acting according to arrow 76, and the force of contact pressure exerted by the first clutch component 14 against the other clutch component 15, to be increased, overcoming the force exerted by the spring. It is shown in FIG. 10, furthermore, that the first clutch component 14 displaceable on the roller axle 20, is provided with an outer tooth system 84a extending parallel to the longitudinal center axis 56 and roller axle 20; and that the conveying roller 10 or a bushing connected fixed with the latter for joint rotation, is provided with an inner tooth system 84b extending parallel to the longitudinal center axis 56 or roller axle 20, said outer and inner sets of teeth engaging one another. When the first clutch component 14 is in its engaged position, the torque is transmitted from the driving roller 9 to the conveying roller 10 via the first clutch component 14 and the outer and inner sets of teeth 84a and 84b. The clutch component 14 is therefore connected with torsional strength with the conveying roller 10 by means of the outer and inner sets of teeth 84a and 84b, and thus displaceably connected vis-a-vis said roller 10.

The mode of operation for transporting piece goods 18 with varying weights has been explained in detail already above and can be applied to FIG. 10 in the same sense.

As shown schematically, at least one brake system can be arranged between the conveying roller 10 and the displaceable first clutch component 14. The brake extension 73 is connected in a fixed manner with the first clutch component 14 on the front side facing the transmitting element 42, and the braking block 74 is connected in a fixed manner with the conveying roller 10 on the inner jacket surface of the latter. The braking surfaces 75 of the brake extension 73 and the braking block 74 are in friction grip with each other when the clutch system 12 is in the switching position in which it is disengaged. This is not shown in any greater detail.

The jointly described FIGS. 11 to 13 show another design variation of the setting device 47 by different views and highly simplified representations. On their front sides 54 and 61 facing one another, the transmitting elements 42 and 48, respectively, each form at least two, preferably four tooth elements 55a and 55b, respectively, in the peripheral direction, which are arranged equally spaced from each other, and axially directed at and opposing one another. Said tooth elements have the ascendingly extending V-flanks 58, which are starting from a stop bridge with the stop surfaces 85 extending parallel to a radial plane (RP) in the direction of rotation (indicated by arrow 77). The ascending V-flank 58 and the radial plane (RP) jointly enclose the angle 67, which is larger than 0°, and particularly in the range of 5° and 50°, e.g. 30°. The at least one spring element 36 comprising the first transmitting element 42 is arranged coaxially with the roller axle 20 between the other transmitting element 48 and the first clutch component 14. According to the present exemplified embodiment, the tooth system 49 is molded onto each of the front sides 54, 61 of the transmitting elements 42, 48, forming one piece with said front sides facing one another. In the present exemplified embodiment, the first transmitting element 42 is made of steel, and in an area of the front side of the transmitting element 42 facing the driving roller 9, a step is formed for the friction coating 86, which is glued to said step. The other transmitting element 48 is preferably made of plastic.

Figure 16:
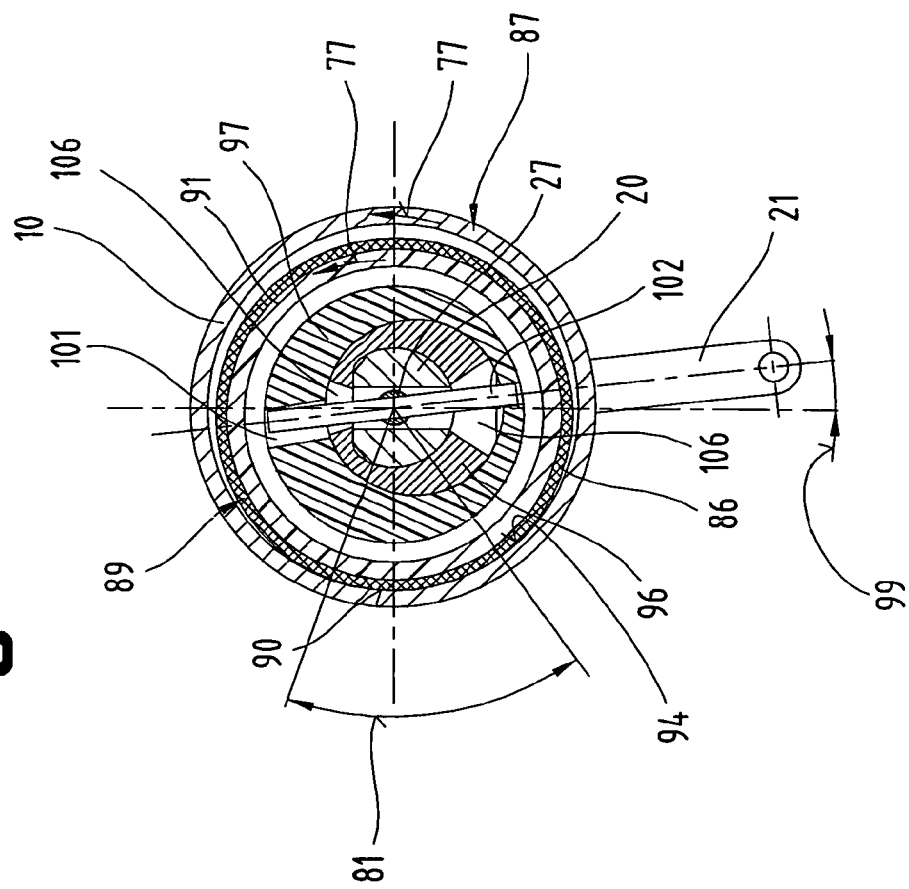
FIG. 16 is a partly sectional and highly simplified schematic representation of the clutch device in the shifting position in which it is engaged, and a front view of the conveying roller according to FIG. 14.
Figure 15:
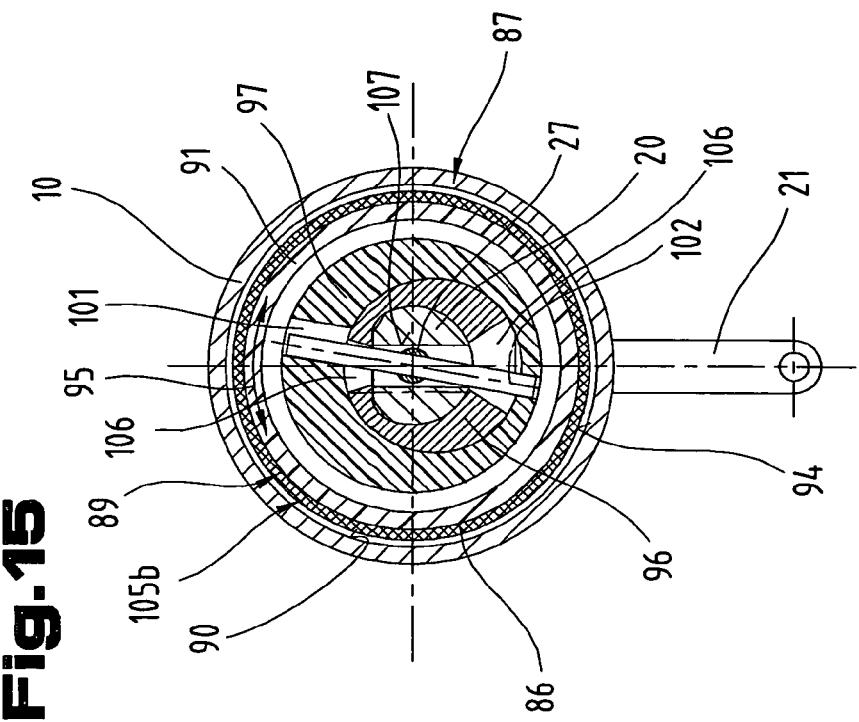
FIG. 15 is a partly sectional and highly simplified schematic representation of the clutch device shown in the shifting position in which it is disengaged, and a front view of the conveying roller according to FIG. 14.

The jointly described FIGS. 14 to 16 show a partly sectional and highly simplified representation of another design variation of the roller arrangement 7 as defined by the invention, comprising a stationary roller axle 20 arranged in the support frame 2 of the stowing roller conveyor, with the driving roller 9 and the drivable and/or, if necessary brakable conveying roller 10 being rotationally supported on said roller axle 20. At least one mechanical clutch system 12 is arranged between the driving roller 9 and the drivable and/or brakable conveying roller 10. Said clutch system comprises the clutch components 87, 88 and 89, which can be adjusted relative to each other via the setting device 13, particularly the switching lever 21. The first clutch component 87 is formed by a part section of the drivable and/or, if need be, brakable, hollow-cylindrical conveying roller 10, and comprises a coupling surface 90 concentric to the longitudinal center axis 56 of the roller axle 20; the second clutch component 88 is formed by a part section of the driving roller 9; and the third clutch component 89, which is arranged between the first and second clutch components 87 and 88, respectively, is formed by a hollow-cylindrical transmission roller 91. Said transmission roller 91 is arranged within the driving and conveying rollers 9 and, respectively, 10. The second clutch component 88 is provided with a recess 92 with a coupling surface 93 concentrically revolving around the longitudinal center axis 56 of the roller axle 20. The recess 92 is disposed coaxially with the roller axle 20. A part section of an inner jacket surface of the conveying roller 10 is forming the coupling surface 90, and an outer jacket surface of the transmission roller 91 is forming the coupling surface 94, which is engageable with the coupling surfaces 90 and 93 of the conveying and driving rollers 10 and 9, respectively. Via the switching lever 21, the transmission roller 91 can be pivoted (as indicated by the double arrow 95) versus the conveying roller 10 and the roller axle 20, from a switching position in which it is disengaged, as shown in FIG. 15, into a switching position in which it is engaged—as shown in FIG. 16—and in drivably connected with the first and second clutch components 87 and, respectively, 88 via the coupling surfaces 90 and, respectively, 93. The hollow-cylindrical, roll-like transmission roller 91 is rotationally supported on a swivel bushing 97, the latter swiveling in the peripheral direction and radial plane vis-à-vis an eccentric sleeve 96 mounted on the roller axle 20. The swivel bushing 97 is connected with the rod-shaped switching element 27, which is rotationally supported in a bore 98 in the roller axle 20, and transmits the switching force exerted by the adjusting device 13. It is possible also, of course, to couple the switching element 27, which is rotatable in the bore 98 by an angle of swivel 99 in the range of 10° and 30°, particularly 15° and 25°, e.g. of 17°, with an electric or pneumatic or hydraulic swiveling drive. In the present case, the sensors 19 of the stowing roller conveyor 1 are formed, for example by photoelectric cells detecting the piece goods without contacting the latter, and the swivel drives of the conveying zones 5a; 5b; 5c; 5d assigned to each roller arrangement 7, are supplied with electric setting or adjusting signals.

On its faces 100 opposing one another, the swivel bushing 97 is provided with the driving slots 101 arranged recessed in said faces. Actuation elements, particularly the cylindrical pins 102, which are connected fixed on the bolt-shaped switching element 27 and moving with the latter, are kept positioned in said driving slots versus the swivel bushing 97, and are secured therein against rotation. The swiveling movement is transmitted via said actuation elements from the switching lever 21 via the switching element 27 and the swivel bushing 97 to the transmission roller 91 rotationally supported on said swivel bushing. The switching lever 21 of the setting device 13 is non-rotationally connected as well with the switching element 27 via a cylindrical pin 102.

The rotating transmission roller 91, which is supported on the swivel bushing 97 via the bearings 103, particularly roller bearings, is divided in the direction of its length 104 in the two clutch part sections 105a and 105b, whereby the first clutch part section 105a is, in the engaged switching position, in friction grip with its coupling surface 94 with a part section of the circumference of the coupling surface 93 of the driving roller 9, and the second clutch part section 105b is in friction grip with its coupling surface 94 with a part section of the circumference of the coupling surface 90 of the drivable and/or, if necessary, brakable conveying roller 10. With the transmission roller 91 in its engaged switching position, the driving torque can be transmitted in this simple from the driving roller 9 to the conveying roller 10 via said transmission roller 91.

The figures show that the eccentric bush 96, on its front sides facing away in the direction of the roller axle 20, is provided with the slot-like receiving areas 106, which are arranged recessed and opposing one another diametrally, and are directed radially and limited peripherally; and that the roller axle 20 is provided with the cylindrical openings 107 penetrated by the cylindrical pins 102. The friction coating 86 on the outer and/or inner-jacket surface of the transmission roller 91 or the driving and conveying rollers 9, 10, respectively, assures slip-free transmission of the driving torque from the driving roller 9 to the conveying roller 10.

Another embodiment is advantageous in that the conveying roller 10 and/or the transmitting roller 91 comprise at least one layer of plastic within the area of the clutch part sections 105a and 105b forming the coupling surfaces 90 and 91, respectively, such layer being at elastically yielding at least to a minor extent at least in the radial direction. Such a layer is formed by a friction coating 86 consisting of, for example polyurethane with a Shore hardness of 80. In its engaged switching position, the coupling surface 94 of the clutch part sections 105a and 105b is flatly pressed with a predetermined force of contact pressure against the part sections of the circumference of the coupling surfaces 90 and 93 of the conveying and driving rollers 10 and 9, respectively, and forms a strip-like zone of engagement between the coupling surface 94 of the transmission roller 91 and the coupling surfaces 90 and 93 of the driving and conveying rollers 9 and 10, respectively, such zone of engagement having a cross-section in the form of a circular arc, and extending in the direction of the roller axle 20, so that high driving torque can be transmitted free of slip from the driving roller 9 to the conveying roller 10 via the transmission roller 91.

The length 81 over which the coupling surface 94 of the clutch part sections 105a and 105b, and the coupling surfaces 90 and 93 of the conveying and driving rollers 9 and 10, respectively, cover each other, amounts to between 10° and 45°, particularly to between 20° and 30°, e.g. to 25°, in the radial plane extending perpendicular to the longitudinal center axis 56; and in each case to about half of the length 104 of the transmission roller 91 in the direction parallel to the roller axle 20. Depending on the amount of driving torque to be transmitted from the driving roller 9 to the conveying roller 10, the length 104 and/or the elasticity of the material of the coating 86, and/or the force of contact pressure exerted by the transmission roller 91 against the first and second clutch components 87 and 88, respectively, may naturally vary. The length 104 may come to between 10 and 120 mm, particularly to between 20 and 60 mm, for example to 50 mm. The outside diameter of the third clutch component 89, or of the coupling surface 94 of the clutch part sections 105a, 105b, is dimensioned at least slightly smaller than the inside diameter of the first and second clutch components 87 and 88, respectively, or of the coupling surfaces 90 and 93, respectively.

It is not shown in detail that the disk-like brake extension 73 with a braking surface 75 extending eccentrically to the longitudinal center axis 56, may be connected fixed on and rotating with the switching element 27 capable of swiveling versus the roller axle 20. With its inner jacket surface, the conveying roller 10 forms, in addition to the coupling surface 90, the additional braking surface 75, which is engageable with the first braking surface 75 of the brake extension 73. When the transmitting roller 91 is swiveled from the engaged switching position to the switching position in which it disengaged, the brake extension 73 is simultaneously swiveled, and the first braking surface 75 of the brake extension 73 is pressed against the additional braking surface 75 of the conveying roller 10 with a predeterminable braking force, i.e., the braking surfaces 75 engage one another, and the conveying roller 10 is braked. In the switching position in which the transmitting roller 91 is engaged, the brake extension 73 is lifted from the additional braking surface 75 on the conveying roller 10. The braking force can be directly set by the freely determinable angle of swivel 99 of the switching lever 21. The approximately disk-shaped brake extension 73 is made of a non-wearing plastic with a high coefficient of friction, e.g. of a thermoplastic or thermosetting plastic.

Figure 17:
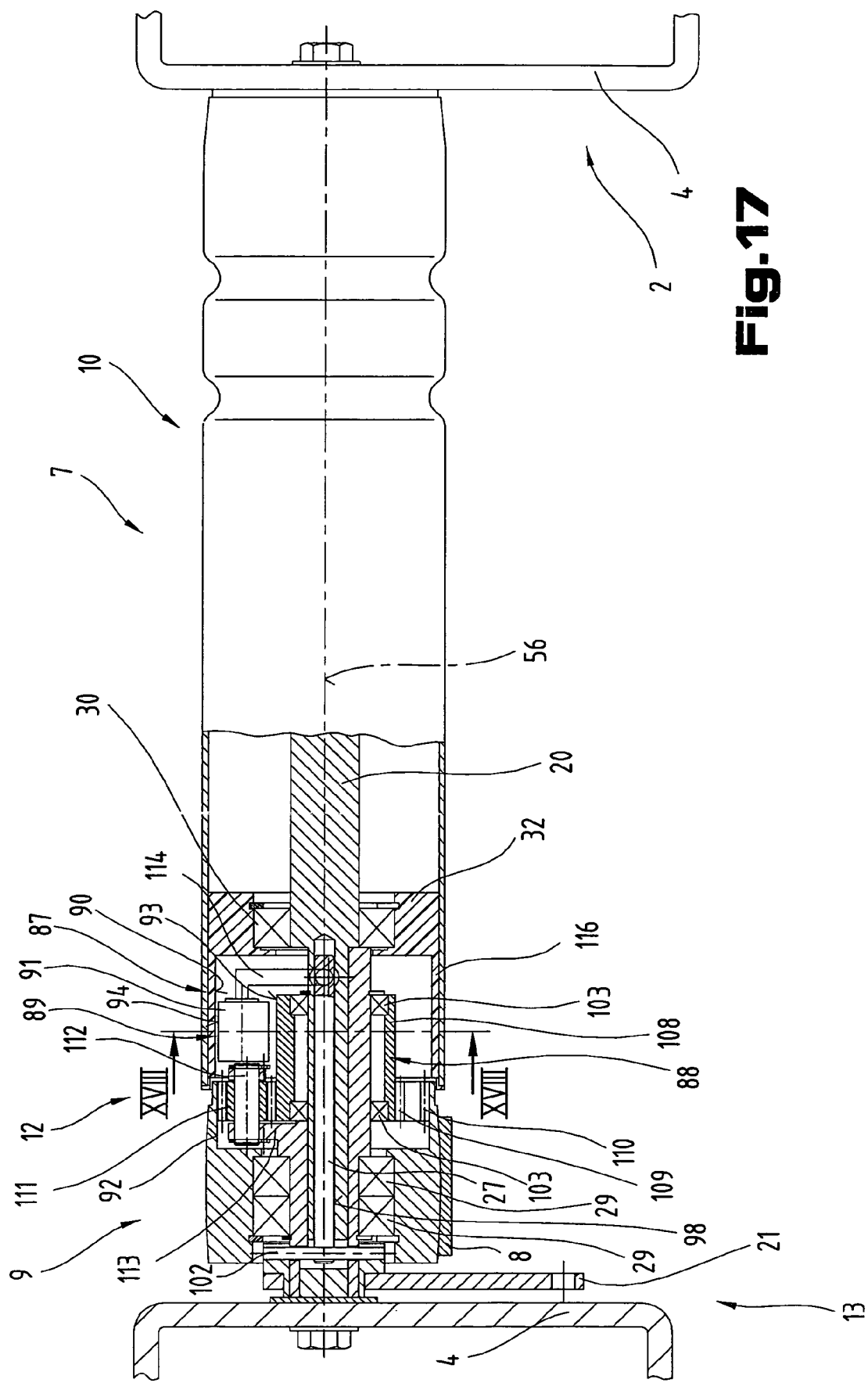
FIG. 17 shows a longitudinal section and highly simplified schematic representation of yet another design variation of the roller arrangement as defined by the invention.
Figure 19:
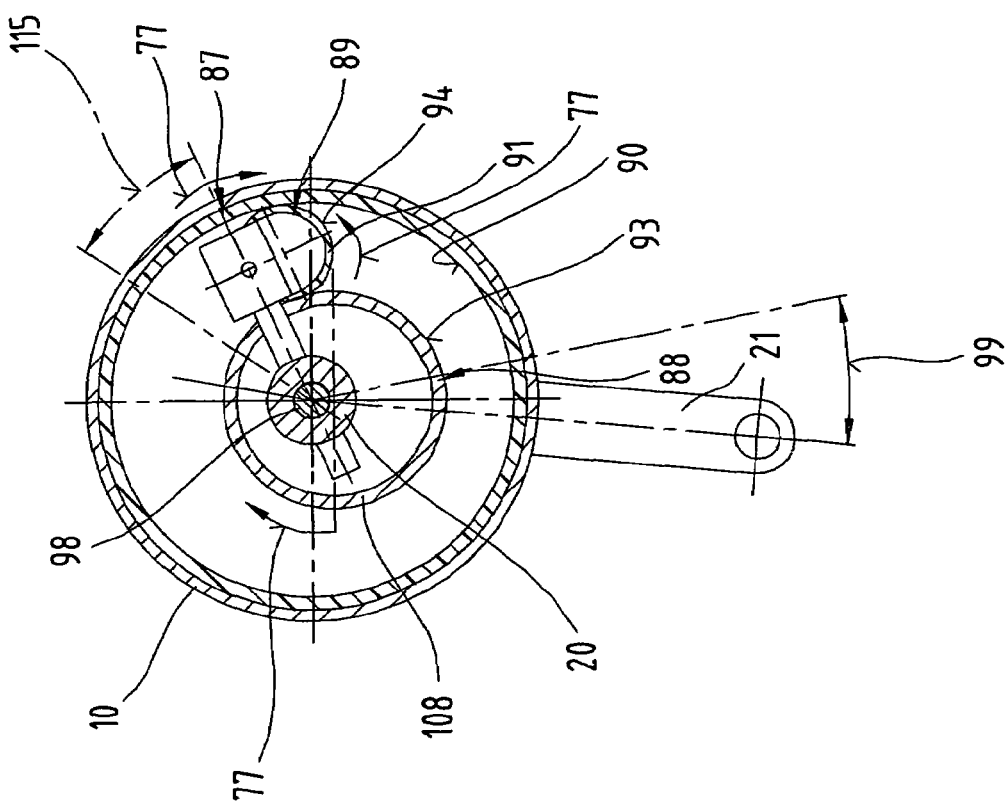
FIG. 19 is a highly simplified schematic representation showing the clutch device in the shifting position in which it is engaged, and a sectional front view of the driving roller and the conveying roller according to FIG. 17.
Figure 18:
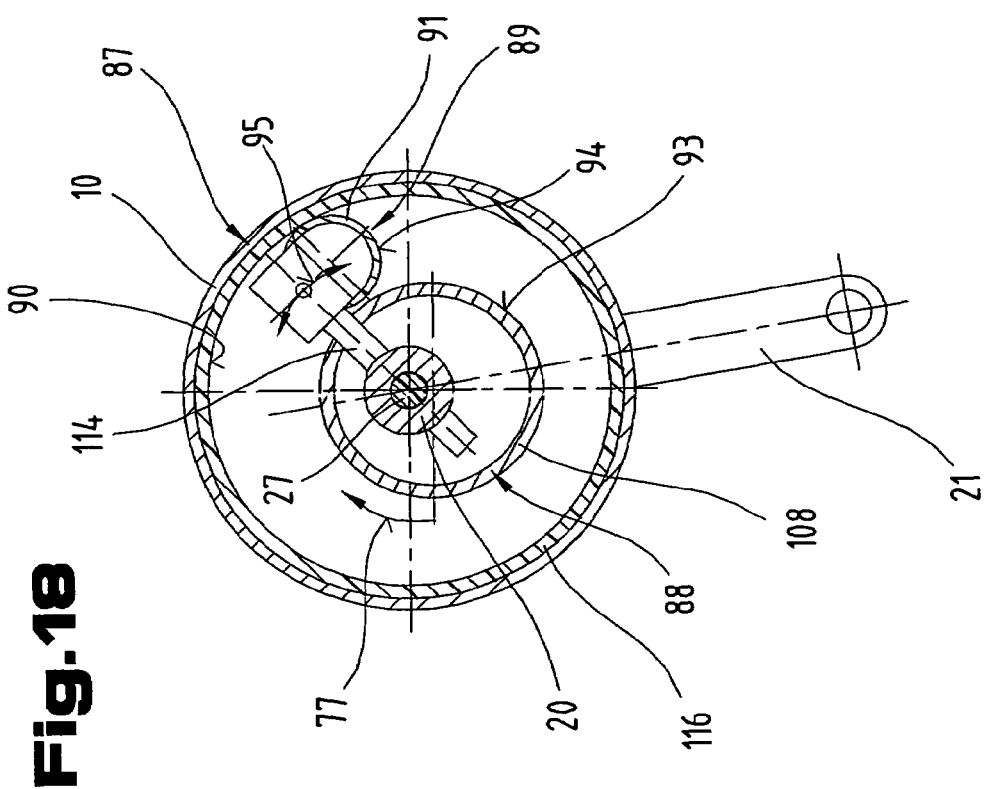
FIG. 18 is a highly simplified schematic representation of the clutch device in the shifting position in which it is disengaged, and a sectional view of the driving and the conveying roller with a section along lines XVIII-XVIII in FIG. 17.

The jointly described FIGS. 17 to 19 show by a partly sectional and highly simplified representation another design variation of the roller arrangement 7 as defined by the invention, for a stowing roller conveyor 1 not shown in said figures. The roller arrangement 7 comprises the stationary roller axle 20 mounted in the side parts 4 of the support frame 2, with the driving roller 9 and the drivable conveying roller 10 mounted on said axle. The clutch system 12 comprising the clutch components 87, 88 and 89, which are adjustable in relation to one another via the setting device 13, particularly the switching lever 21, is arranged between the driving roller 9 and the conveying roller 10. The first clutch component is formed by a part section of the conveying roller 10; the second clutch component by a hollow-cylindrical driving roller 108 connected to and driven by the driving roller 9; and the third clutch component 89, which is arranged between the first and second clutch components 87 and 88, respectively, is formed by a circularly cylindrical, roll-type transmission roller 91. In the embodiment shown in said figures, the driving roller 108 is equipped in an end area facing the driving roller 9 with an outer tooth system 109, and the driving roller 9 is equipped within the area of its recess 92 with an inner tooth system 110 arranged coaxially with the roller axle 20. An intermediate toothed gear 111 is arranged between the outer and inner sets of teeth 109 and 110, respectively, of the driving roller 108, and the driving roller 9. The intermediate gear 111 is rotationally supported on a stationary axle 112, which in turn is secured on a fixed holding flange 113. The driving roller 108 is therefore continually driven, revolving on the roller axle 20 with a predetermined number of revolutions on the direction of rotation (indicated by arrow 77).

The roll-like transmitting roller 91 is supported on a setting lever 114 swiveling around the roller axle 20. Said setting lever is connected with the rod-shaped switching element 27 rotationally supported in the bore 98, and transmitting the switching force of the setting device 13, particularly of the switching lever 21. The transmitting roller 91, which is capable of swiveling from its disengaged switching position according to FIG. 18, to its engaged switching position according to FIG. 19, is, in its engaged position, in engagement, i.e. in driving connection with the coupling surface 93 of the second clutch component 88 extending eccentrically to the longitudinal center axis 56 of the roller axle 20, and with the coupling surface 90 of the first clutch component 87 concentrically revolving around the longitudinal center axis 56, and transmits the torque from the driving roller 108 to the conveying roller 10. The angle of swivel 115 of the transmitting roller 91 conforming to the angle of swivel 99 of the switching lever 21, amounts to between 10° and 30°, particularly between 15° and 25°, e.g. to 17°.

The driving roller 108 is rotationally supported on the roller axle 20 via the bearings 103, particularly antifriction bearings.

The transmitting roller 91 is made of plastic, e.g. a thermosetting plastic, or thermoplastic. The conveying roller bottom 32 is shaped like a pot and, with its hollow-cylindrical type of wall projecting from its base, is forming the coupling surface 90 for the transmitting roller 91. The first clutch component 87 may, of course, also form the coupling surface 90 by a part section of the inner jacket surface of the conveying roller 20. The bottom 32 of the conveying roller may be made of plastic or metal, and is connected fixed for moving with the conveying roller 10, for example via slotted pins, clamping pins, or adhesive.

Figure 20:
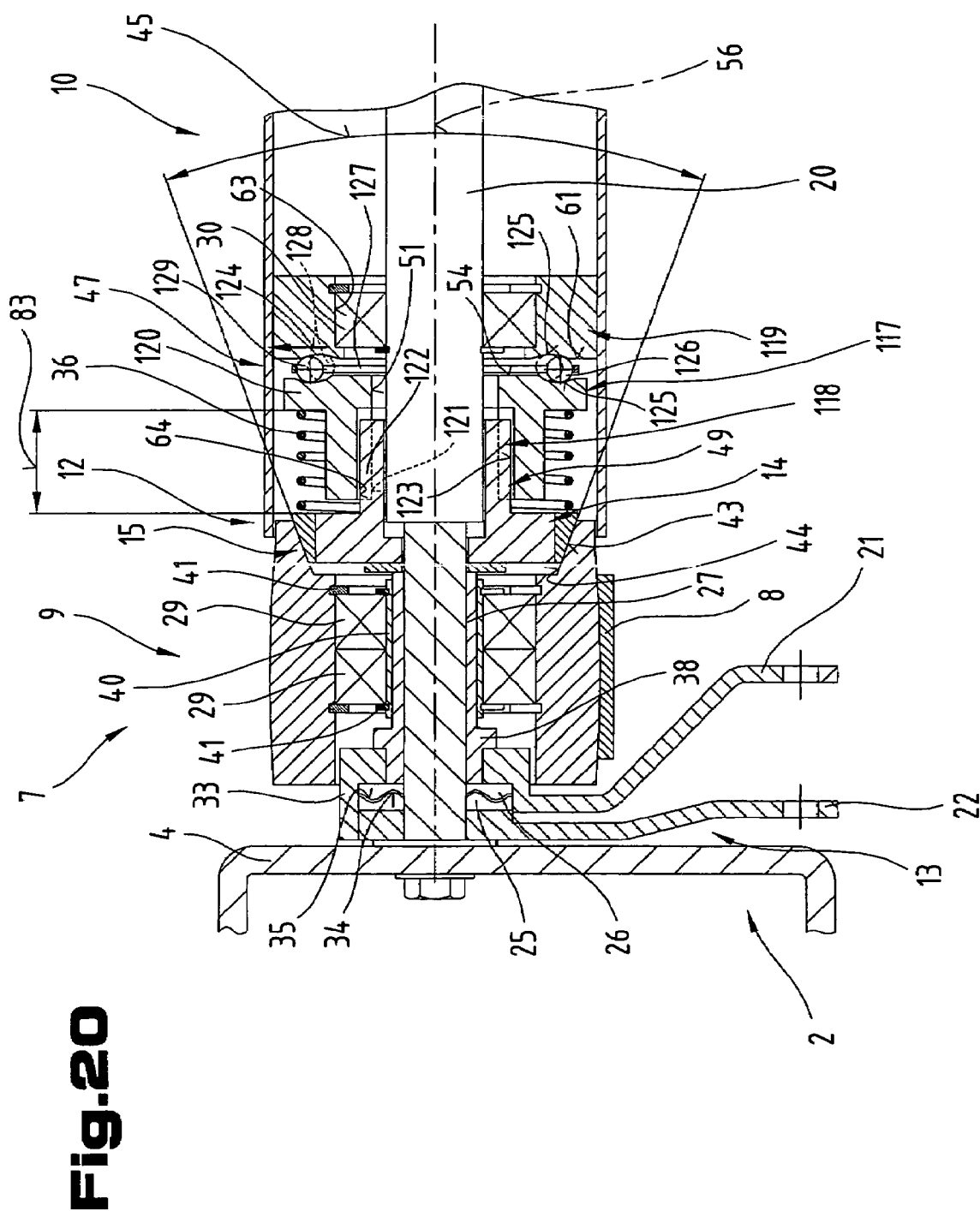
FIG. 20 is a longitudinal section and highly simplified schematic representation of a cutout from another embodiment of the roller arrangement as defined by the invention, comprising another design variation of the setting device.

FIG. 20 shows another embodiment of the roller arrangement 7 as defined by the invention by a partly sectional and highly simplified representation. Said roller arrangement 7 comprises the rotationally supported and driven driving roller 9 mounted on the stationary roller axle 20 arranged in the support frame 2; and the at least drivable conveying roller 10 rotationally supported on the roller axle 20 via the bearings 30. The at least one mechanical clutch system 12 particularly acting through friction grip, is arranged between the driving and conveying rollers 9 and 10, respectively. The clutch system 12 is comprised of the clutch components 14 and 15 that are adjustable in relation to one another via the setting device 13, particularly the switching levers 21 and 22. The first clutch component is axially adjustably arranged on the roller axle 20 and can be shifted from the shifting position in which it is engaged, to the shifting position in which it is disengaged, against the at least one spring element 36.

At least one mechanical setting device 47 adjusting a force of contact pressure acting on the conveying roller 10 under the influence of the weight of the piece goods 18 to be transported as shown in FIG. 1, is arranged between the conveying roller 10 and the first clutch component 14. The setting device 47 comprises at least the two mechanical transmitting elements 117 and 118, which are engaging one another via the tooth system 49, and are adjustable against each other in the axial direction relative to the roller axle 20; as well as a stationary third transmitting element 119. The rotationally symmetrical second transmitting element 117 is forming a hollow-cylindrical basic body, as well as a flange 120 projecting radially outwards from said basic body and extending all around, with a through-extending opening 51 being arranged coaxially with the roller axle 20 in said flange.

On its inner circumference, the second transmitting element 117 is provided with an inner tooth system 121 extending parallel to the roller axle 20, and the first clutch component 14 is axially displaceably arranged on said transmitting element, said first clutch component forming an annular or bridge 122 with an outer tooth system 123, the latter extending parallel to the roller axle 20 and complementing the inner tooth system. The first clutch component 14, particularly the ring bridge 122, is forming the first transmitting element 118. The at least one spring element 36 is arranged between the first clutch component 14 and a second transmitting element 117. A third transmitting element 119 has the shape of a disk and is provided with the bore 63 extending coaxially with the roller axle 20 for receiving the bearing 30 of the conveying roller 10, and is connected fixed for with the latter. The second transmitting element 117 is arranged between the first and third transmitting elements 118 and 119, respectively. The first and the second transmitting elements 118 and 117, respectively, are adjustable, particularly axially in relation to the third transmitting element 119 and relative to one another.

The transmitting elements 117 and 119 disposed adjacent to one another are provided on their front sides 54 and 61, respectively, said front sides facing one another, with the raceways 125, which are offset against one another in the radial direction (as indicated by arrow 124), being recessed on said front sides, extending all around radially. The ball-shaped sliding elements 126 are arranged between said raceways in the radial direction (as indicated by arrow 124). The raceways 125 are extending over a circular arc-shaped, convex course, each facing the front sides 54 and 61.

The first clutch component 14 is pressed against the other clutch component 15 with the force of contact pressure corresponding with the spring force dimensioned based on the minimum weight of the piece of goods 18 to be transported.

With the first clutch component 14 in its engaged switching position, the sliding elements 126 accommodated in a cage 127 migrate with the increase in weight of the piece of goods 18 in the radial direction (as indicated by arrow 124), from a basic position 128 as indicated by dashed lines, in which the second transmitting element 117 is non-actuated in the axial direction in relation to the roller axle 20, into an operating position 129 as shown by fully drawn lines, in which latter position the second or center transmitting element 117 is moved toward the axially displaceable first clutch component 14, and the force of contact pressure is adjusted by reducing the spacing 83 between the first clutch component 14 and the second transmitting element 117, in a manner such that a slip-free engagement is achieved between the two clutch components 14 and 15. By reducing the spacing 83, the force of the spring rises and thereby presses the clutch component 14 against the clutch component 15 with an increased force of contact pressure, so that the torque is transmitted between the clutch components 14 and 15 free of slip.

With the sliding elements 126 in their basic position, the first clutch component 14 is pressed against the other clutch component 15 exclusively by the force of contact pressure proportional to the spring force.

The mode in which the setting device 47 functions has already been explained above and can be applied to the present embodiment as well.

The jointly described FIGS. 21 and 22 show different views of the stowing roller conveyor 1 for the roller arrangement 7 according to FIGS. 14 to 19 employed in said conveyor system in each conveying zone 5a, 5b, 5c, 5d. The stowing roller conveyor 1 is comprised of the support frame 2 with the side parts 4 extending in the direction of conveyance (according to arrow 3) and limiting the stowing roller conveyor 1 laterally. Said side parts are linked by a number of crossbeams (not shown) arranged spaced from one another viewed in the conveying direction (indicated by arrow 3), and are thus kept apart. Viewed in the direction of conveyance (according to arrow 3), the stowing roller conveyor 1 is divided in a number of successively formed conveying zones 5a to 5d. Each conveying zone 5a to 5d comprises a multitude of the non-driven rollers 6, and at least one roller arrangement 7 according to FIGS. 14 to 19, said rollers and roller arrangement being arranged spaced from each other in the conveying direction (according to arrow 3) in the support frame 2, particularly in the side parts 4.

According to FIGS. 1 and 2, at least one sensor 19, particularly a switching flap or a photoelectric cell, e.g. a light barrier protruding into the path of travel of the piece goods 18, is assigned to each conveying zone 5a to 5d in the direction of conveyance (indicated by arrow 3) for detecting the piece goods 18, e.g. auxiliary loading means such as cardboard boxes, pallets, or wooden crates, transported from the conveying zone 5a to the conveying zone 5a.

In the present exemplified embodiment, the setting device 13 comprises the two switching levers 21, 22 pivot-mounted on the roller axle 20 of the roller arrangement 7 of each conveying zone 5a to 5d; and a sensor 19 for each of the respective conveying zones 5a, 5b, 5c and 5d, with the first switching lever system 23 connecting the first switching lever 21; as well as with another switching lever system 24 connecting the second switching lever 22 of the respective conveying zones 5d, 5c, 5b, 5a located upstream in the direction of conveyance (according to arrow 3). The switching lever systems 23, 24 are hinge-jointed with the pivot-mounted switching flaps, and are each pivotably connected with the switching levers 21, 22. By wiring the conveying zones 5a to 5d with each other, it is possible to control, e.g. the stowing process for storing the piece goods 18 along the stowing roller conveyor 1 in a targeted manner.

If, as shown in FIG. 1, the conveyor zone 5d is occupied by a piece of goods 18, the sensor 19 or switching flap assigned to said conveying zone 5d is depressed by the piece of goods 18; the switching lever 21 connected with the switching flap of said conveying zone 5d via the switching lever system 23 and pivot-mounted on the roller axle 20, is actuated; and the clutch system 12, the latter being in its basic position in the engaged or coupled switching condition according to FIGS. 16; 19, is shifted into the switching position in which it is disengaged or uncoupled according to FIGS. 15; 18. In such process, the driven conveying roller 10 is uncoupled from the driving roller 9, with the result that the conveying roller 10 and the other rollers 6 arranged in said conveying zone 5d, as well as the piece goods 18, are stopped. Said process can be continued in any desired way along the line of the stowing roller conveyor 1. In the present exemplified embodiment, the setting device 13 comprises the switching lever 21, which is pivot-mounted on the roller axle 20 of the roller arrangement 9 of each conveying zone 5a to 5d; and the first switching lever system 23, the latter being connected with the sensor of the conveying zone 5a; 5b; 5c; 5d via the switching lever 21.

In concluding, it is noted also that the first transmitting element 42; 117 and/or the additional transmitting element 48; 118 and/or the first clutch component 14, or at least parts thereof are made of metal and/or plastic, e.g. thermoplastic, or thermosetting plastic, e.g. glass fiber-reinforced polyamide with a glass content of preferably 25%; polycarbonate, etc.

For the sake of good order, it is finally pointed out also that in the interest of a better understanding of the structure of the moving units and the device as a whole, the latter and its components are to some extent represented untrue to scale and/or enlarged and/or reduced.

The problems forming the basis of independent inventive solutions are described in the present specification.

Most important of all, the embodiments shown in FIGS. 1 to 9; 10; 11, 12, 13; 14, 15, 16; 17, 18, 19; 20; 21, 22 may form the object of independent solutions as defined by the invention. The respective problems and solutions are explained in the detailed descriptions of said figures.

LIST OF REFERENCE NUMERALS

1 Stowing roller conveyor
2 Support frame
3 Arrow
4 Side part
5a Conveying zone
5b Conveying zone
5c Conveying zone
5d Conveying zone
6 Roller
7 Roller arrangement
8 Driving element
9 Driving roller
10 Conveying roller
11 Belt
12 Clutch system
13 Setting device
14 Clutch component
15 Clutch component
16 Contact pressure-exerting roller
18 Piece of goods
19 Sensor
20 Roller axle
21 Switching lever
22 Switching lever
23 Switching lever system
24 Switching lever system
25 Fan disk
26 Fan disk
27 Switching element
29 Bearing
30 Bearing
31 Jacket, conveying roller
32 Bottom, conveying roller
33 Receiving body
34 Switching cam
35 Switching cam
36 Spring element
38 Collar
39 Support disk
40 Journal bearing bushing
41 Safety ring
42 Transmitting element
43 Coupling surface
44 Coupling surface
45 Opening angle
47 Setting device
48 Transmitting element
49 Set of teeth
50 Basic body
51 Through-extending opening
52 Outer circumference
53 Front side
54 Front side
55a Tooth element
55b Tooth element
56 Longitudinal center axis
57 Longitudinal center axis
58 V-flank
59 Basic body
60 Front side
61 Front side
62 Bottom
63 Bore
64 Inner circumference
65 Longitudinal groove
66 V-flank
67 Angle
68 Length
69 Recess
70 Front side
71 Recess
72 Brake system
73 Brake extension
74 Braking block
75 Braking surface
76 Spring force
77 Direction of rotation
78 Force component
79 Switching force
80 Axial force
81 Length of coverage
82 Braking force
83 Spacing
84a Outer set of teeth
84b Inner set of teeth
85 Stop surface
86 Friction coating
87 Clutch component
88 Clutch component
89 Clutch component
90 Coupling surface
91 Transmitting roller
92 Recess
93 Coupling surface
94 Coupling surface
95 Double arrow
96 Eccentric bushing
97 Pivot bush
98 Bore
99 Angle of swivel
100 Face
101 Driving slot
102 Cylindrical pin
103 Bearing
104 Length
105a Part section of clutch
105b Part section of clutch
106 Receiving area
107 Opening
108 Driving roller
109 Outer set of teeth
110 Inner set of teeth 111 Intermediate gear
112 Axle
113 Holding flange
114 Setting lever
115 Angle of swivel
116 Wall
117 Transmitting element
118 Transmitting element
119 Transmitting element
120 Flange
121 Inner set of teeth
122 Ring bridge
123 Outer set of teeth
124 Radial direction
125 Raceway
126 Sliding ball
127 Cage
128 Basic position
129 Operating position

The invention claimed is:

1. A roller arrangement (7) for conveying piece goods (18) along a stowing roller conveyor (1), comprised of a stationary roller axle (20) arranged in a support frame (3) of the stowing roller conveyor (1); a driving roller (9) and a conveying roller (10) adapted to be driven and/or braked, if need be, rotationally mounted on said roller axle; as well as a mechanically actuated clutch system (12), particularly a friction clutch system arranged between said rollers (9) and (10), said clutch system comprising clutch components (14, 15) adjustable against one another via a setting device (13); whereby at least one of the clutch components (14, 15) is axially adjustable against the action of at least one spring element (36), from a switching position in which such component is engaged, into a switching position in which it is disengaged, and the first clutch component (14) is drive-connected with the conveying roller (10), and the other clutch component (15) with the driving roller (9); and coupling surfaces (43, 44) of the clutch components (14, 15), such surfaces facing each other, are supported against one another by a force of contact pressure in the switching position in which they are engaged, wherein a self-adjusting setting device (47) is arranged between the conveying roller (10) and the first clutch component (14) adjustable on the roller axle (20), said setting device comprising at least two transmitting elements (42, 48; 117, 118) engaged via a tooth system (49) and adjustable against one another in the axial and/or peripheral directions in relation to the roller axle (20); the first clutch component (14), in the presence of a relative movement between the conveying roller (10) and the first clutch component (14), is automatically adjusted toward the other clutch component (15) in the peripheral direction of said conveying roller, and in the axial direction relative to the roller axle (20); and the coupling surface (43) of the first clutch component (14) is pressed against the coupling surface (44) of the other clutch component (15) with a force of contact pressure set depending on the weight of the piece goods (18) transported by the conveying roller (10), until slip-free friction grip is reached between the two clutch components (14, 15).

2. The roller arrangement according to claim 1, wherein the first transmitting element (42; 118) is coupled or drive-connected with the first clutch component (14), and the second transmitting element (48; 117) with the conveying roller (10).

3. The roller arrangement according to claim 1, wherein the setting device (47) comprises mechanical transmitting elements (42, 48) engaged with one another via a tooth system (49), and adjustable against each other in the axial and peripheral directions in relation to the roller axle (20); and V-grooves (58) of the tooth system (49) extend at an angle relative to the roller axle (20) or to a radial plane extending perpendicular to the roller axle (20).

4. The roller arrangement according to claim 1, wherein at least the first transmitting element (42) is coaxially arranged within the other transmitting element (48) connected fixed in motion with the conveying roller (10) adapted to be driven and/or braked, if necessary; and said elements are connected with and displaceable against one another via the tooth system (49) in the peripheral direction of the transmitting elements (42, 48), and in the axial direction relative to the roller axle (20).

5. The roller arrangement according to claim 1, wherein the first transmitting element (42) is formed by a cylindrical basic body (50) with a through-extending opening (51) extending coaxially in relation to the roller axle (20), and is limited by two front sides (53, 54); and at least two, tooth elements (55a) equally spaced from each other, are arranged on the outer circumference (52) of the basic body (50).

6. The roller arrangement according to claim 5, wherein the tooth elements (55a) have V-flanks (58) extending in the direction of the roller axle (20) inclined in relation to each other, and slanted relative to the longitudinal center axis (56) of the roller axle (20).

7. The roller arrangement according to claim 5, wherein the tooth elements (55a) have V-flanks (58) extending in the direction of the roller axle (20) parallel to one another and inclined relative to the longitudinal center axis (56) of the roller axle (20).

8. The roller arrangement according to claim 5, wherein the other transmitting element (48) is formed by a hollow-cylindrical basic body (59) and, if need be, a bottom (62) arranged on one of its front sides (60, 61); the bottom (62) has a bore (63) extending coaxially with the roller axle (20); and twisted longitudinal grooves (65) are arranged recessed on the inner circumference (64) in the peripheral direction of the transmitting element (48), said grooves being equally spaced from one another and complementing the tooth elements (55a), and being limited peripherally.

9. The roller arrangement according to claim 8, wherein in the direction of the roller axle (20), the longitudinal grooves (65) have V-flanks (66) extending inclined against each other and slanted toward the longitudinal center axis (56) of the roller axle (20).

10. The roller arrangement according to claim 8, wherein in the direction of the roller axle (20), the longitudinal grooves (65) have V-flanks extending parallel to one another and inclined toward the longitudinal center axis (56) of the roller axle (20).

11. The roller arrangement according to claim 8, wherein the length (81) over which the transmitting elements (42, 48) cover each other, such elements being guided one in the other in the form of a screw line, corresponds with at least twice the amount of the axial distance over which the first clutch component (14), the latter being in driving connection with the other clutch component (15), is adjustable from a position in which it is engaged, into a position in which it is disengaged.

12. The roller arrangement according to claim 8, wherein the other transmitting element (48) has the shape of a pot and is forming on the bottom (62) a means for receiving the bearing (30) of the conveying roller (10).

13. The roller arrangement according to claim 1, wherein the first transmitting element (42) is displaceably and/or rotationally supported on the roller axle (20), and connected fixed in motion with the first clutch component (14), particularly forming one piece with the latter.

14. The roller arrangement according to claim 1, wherein the first clutch component (14) is axially displaceably supported on the roller axle (20) and connected fixed with the conveying roller (10) for moving with the latter via a tooth system (84a, 84b); and the transmitting elements (42, 48) engaging each other and being adjustable against one another in the axial and peripheral directions in relation to the roller axle (20), are supported against the first clutch component (14) by at least one pre-tensioned spring element (36).

15. The roller arrangement according to claim 1, wherein at their front sides (54, 61) facing one another, the transmitting elements (42, 48) engaging each other are provided with at least two tooth elements (55a, 55b) equally spaced from one another in the peripheral direction of the transmitting elements (42, 48), said tooth elements having V-flanks (58) ascending in the peripheral direction; and the at least one spring element (36) is arranged between the transmitting elements (42, 48), or between one of the transmitting elements (42; 48) and the first clutch component (14).

16. The roller arrangement according to claim 1, wherein the other transmitting element (48) is formed by a disk-like basic body (59), and a recess extending through said disc-like basic body coaxially whith the roller axle (20), with a bearing (30) for the conveying roller (10) being inserted in said recess; and axially protruding tooth elements (55b) are formed on the front side (61) facing the first transmitting element (42).

17. The roller arrangement according to claim 1, wherein the V-flank (58, 66) and the longitudinal center axis (56) or radial plane jointly enclose an angle (67) greater than 0°.

18. The roller arrangement according to claim 1, wherein at its front side (54) facing the other transmitting element (48), the first transmitting element (42) has a recess (69) extending coaxially with the roller axle (20) for receiving the spring element (36) in areas of said recess.

19. The roller arrangement according to claim 1, wherein a brake system (72) is arranged between the conveying roller (10) or the other transmitting element (48), and the first transmitting element (42) displaceable on the roller axle (20), and/or the first clutch component (14); and the brake system (72) has a brake extension (73) and a braking block (74).

20. The roller arrangement according to claim 19, wherein the displaceable first transmitting element (42) and/or the first clutch component (14) comprise the brake extension (73), the latter being engageable in friction grip with the braking block (74) seated fixed on the roller axle (20) and/or on an inner jacket surface of the conveying roller (10); and the brake extension (73) and the braking block (74) are provided with conical braking surfaces (75).

21. The roller arrangement according to claim 19, wherein the brake extension (73) forms a guide for the at least one spring element (36).

22. The roller arrangement according to claim 1, wherein a switching element (27) slidingly supported and movable in the axial direction, and transmitting the switching force exerted by the setting device (13), is arranged on the roller axle (20); and the switching element (27) is supported against the first clutch component (14).

23. The roller arrangement according to claim 1, wherein the first clutch component (14) is joined with the first transmitting element (42) and has a coupling surface (43) conically tapering in the direction of the driving roller (9); and the opening angle (45) amounts to between 5° and 5°.

24. The roller arrangement according to claim 1, wherein the driving roller (9) has a recess with a conically tapering coupling surface (44), said recess forming the other clutch component (15); and the opening angle (45) amounts to between 5° and 5°.

25. The roller arrangement according to claim 1, wherein the setting device (47) comprises mechanical transmitting elements (117; 118) engaged with one another via a tooth system (49), and adjustable against each other in the direction axial to the roller axle (20), as well as a third transmitting element (119) arranged coaxially with the roller axle (20); and on their front sides (54, 61) facing each other, the second and third transmitting elements (117, 119) disposed adjacent to one another, are designed at their front sides in the form of raceways (125), the latter being arranged recessed in said front sides and extending radially all around in a convex form, and having a cross-section in the form of a circular arc, with each of said raceways facing the front side (54; 61) and being offset one against the other in the radial direction of the transmitting elements; and at least one adjustable sliding block (126) is arranged between said raceways in the radial direction.

26. The roller arrangement according to claim 25, wherein the first clutch component (14) is forming the first transmitting element (118), and comprises a ring bridge (122) with an outer tooth system extending parallel to the roller axle (20); the second transmitting element (117) has a hollow-cylindrical basic body with an inner tooth system (121) extending parallel to the roller axle (20); and the second transmitting element (117) is axially displaceably arranged on the first transmitting element (118).

27. The roller arrangement according to claim 25, wherein the at least one spring element (36) is arranged pre-tensioned between the first clutch component (14) and the second trahsmitting element (117).

28. A stowing roller conveyor (1) with a multitude of rollers (6, 9, 10) mounted in a support frame (2) and assigned to several conveying zones (5a to 5d), with a roller arrangement (7) being arranged in each conveying zone (5a to 5d), such roller arrangement being coupled with additional rollers (6) of the same conveying zone (5a to 5d), wherein the roller arrangement (7) is formed according to claim 1.

29. A roller arrangement (7) for a stowing roller conveyor (1), comprising a stationary roller axle (20) arranged in a support frame (2) of the stowing roller conveyor (1); a driving roller (9) and a conveying roller (10) adapted to be driven and/or braked, if necessary, and rotationally supported on said roller axle; as well as a mechanical clutch system arranged between said driving and conveying rollers, said clutch system comprising clutch components (87, 88, 89) adjustable relative to one another via a setting device (13), wherein the first clutch component (87) is formed by the conveying roller (10) with a coupling surface (90) arranged concentrically in relation to the longitudinal center axis (56) of the roller axle (20); the second clutch component (88) is formed by the driving roller (9) or a driving roller (108) drive-connected to said roller (9); and the third clutch component (89) arranged between the first and second clutch components (87, 88) is formed by a transmitting roller (91); and said transmitting roller (91), the latter being eccentrically supported and adjustable from a switching position in which it is disengaged, into a switching position in which it is engaged, and drive-connected in the latter switching position with coupling surfaces (90, 93) of the first drive-connected with the first and the second clutch components (87; 88); or one of the coupling surfaces (90; 93) of the first and second clutch components (87; 88) is formed eccentrically to the longitudinal center axis (56) of the roller axle (20) of the first clutch component (87).

30. The roller arrangement according to claim 29, wherein the transmitting roller (91) is rotationally supported on a pivot bushing (97) adjustably arranged on an eccentric bushing (96) secured on the roller axle (20), and adjustable in the peripheral direction of the eccentric bushing, and connected with a rod-shaped switching element (27) rotationally supported in a bore (98) in the roller axle (20), and transmitting the switching force exerted by the setting device (13).

31. The roller arrangement according to claim 29, wherein the outside diameter of the transmitting roller (91) is dimensioned slightly smaller than the inside diameter of the driving and conveying rollers (9; 10, respectively).

32. The roller arrangement according to claim 31, wherein the driving roller (9) comprises a recess (92) forming the second clutch component (88), said recess having a coupling surface (93) concentrically to the longitudinal center axis (56) of the roller axle (20).

33. The roller arrangement according to claim 29, wherein a swivel angle limiting the distance of adjustment of the transmitting roller (91) and measured between the engaged and the disengaged switching positions, amounts to between 10° and 30°.

34. The roller arrangement according to claim 29, wherein the transmitting roller (91) is supported on a setting lever (14) capable of swiveling around the roller axle (20), said setting lever being connected with a rod-shaped switching element (27) rotationally supported in a bore (98) in the roller axle (20), and transmitting the switching force exerted by the setting device (13).

* * * * *